(12) United States Patent
Fukuda

(10) Patent No.: US 12,315,961 B2
(45) Date of Patent: May 27, 2025

(54) POWER STORAGE DEVICE, ELECTRIC APPLIANCE, ELECTRODE TERMINAL COMPONENT, AND MANUFACTURING METHOD THEREOF

(71) Applicant: DAI NIPPON PRINTING CO., LTD., Tokyo (JP)

(72) Inventor: Jun Fukuda, Tokyo (JP)

(73) Assignee: DAI NIPPON PRINTING CO., LTD., Tokyo (JP)

(*) Notice: Subject to any disclaimer, the term of this patent is extended or adjusted under 35 U.S.C. 154(b) by 0 days.

(21) Appl. No.: 18/256,072

(22) PCT Filed: Dec. 1, 2021

(86) PCT No.: PCT/JP2021/044023
§ 371 (c)(1),
(2) Date: Jun. 6, 2023

(87) PCT Pub. No.: WO2022/130973
PCT Pub. Date: Jun. 23, 2022

(65) Prior Publication Data
US 2024/0039132 A1 Feb. 1, 2024

(30) Foreign Application Priority Data
Dec. 17, 2020 (JP) .................. 2020-209200

(51) Int. Cl.
*H01M 50/557* (2021.01)
*H01M 50/176* (2021.01)
(Continued)

(52) U.S. Cl.
CPC ....... *H01M 50/557* (2021.01); *H01M 50/176* (2021.01); *H01M 50/188* (2021.01);
(Continued)

(58) Field of Classification Search
None
See application file for complete search history.

(56) References Cited

U.S. PATENT DOCUMENTS
2011/0086264 A1  4/2011  Tsukamoto et al.

FOREIGN PATENT DOCUMENTS
JP  2000-285904 A  10/2000
JP  2002-056839 A  2/2002
(Continued)

OTHER PUBLICATIONS

Jun. 25, 2021 Office Action issued in Japanese Patent Application No. 2020-209200.
(Continued)

*Primary Examiner* — Haixia Zhang
(74) *Attorney, Agent, or Firm* — Oliff PLC

(57) ABSTRACT

An electrode terminal component used in a power storage device including a power storage cell and a package member covering it includes: an electrode terminal made of metal, plate-shaped, and connected to the power storage cell to protrude out of the package member; and a heat-seal member made of resin, having a heat-sealing property with both the package member and the electrode terminal, and formed to surround a predetermined area on the top, bottom, and opposite side faces of the electrode terminal. A depression or elevation is formed in a predetermined area on the opposite side faces of the electrode terminal. The dimension in the electrode width direction of the depression or elevation formed on the opposite side faces of the electrode terminal is 0.1 mm or more.

10 Claims, 15 Drawing Sheets

(51) Int. Cl.
*H01M 50/188* (2021.01)
*H01M 50/193* (2021.01)
*H01M 50/562* (2021.01)

(52) U.S. Cl.
CPC ....... *H01M 50/193* (2021.01); *H01M 50/562* (2021.01); *H01M 2220/20* (2013.01)

(56) References Cited

FOREIGN PATENT DOCUMENTS

| | | |
|---|---|---|
| JP | 2004-362935 A | 12/2004 |
| JP | 3719235 B2 | 11/2005 |
| JP | 2011-086834 A | 4/2011 |
| JP | 2013-196930 A | 9/2013 |
| JP | 2014-179193 A | 9/2014 |
| JP | 2016-024989 A | 2/2016 |
| JP | 2016-162491 A | 9/2016 |

OTHER PUBLICATIONS

Feb. 15, 2022 Search Report issued in International Patent Application No. PCT/JP2021/044023.

POWER STORAGE DEVICE, ELECTRIC APPLIANCE, ELECTRODE TERMINAL COMPONENT, AND MANUFACTURING METHOD THEREOF

TECHNICAL FIELD

The present invention relates to power storage devices, electric appliances, electrode terminal components, and manufacturing methods of these, and more particularly relates to, for example: power storage devices such as lithium-ion cells and capacitors; electric appliances incorporating power storage devices, such as electrically driven vehicles, electrically driven airplanes, electrically driven ships, power storage facilities, and smartphones; electrode terminal components for power storage devices; and manufacturing methods of these.

BACKGROUND ART

Today, from the perspectives of environmental concerns, resource saving, and the like, much attention is paid to electrically driven vehicles of which at least part of the driving power is supplied from motors. Electrically driven vehicles include electric vehicles (EVs), hybrid electric vehicles (HEVs), and plug-in hybrid electric vehicles (PHEVs). Electric vehicles rely solely on a motor as a motive power source; hybrid electric vehicles and plug-in hybrid electric vehicles rely on both a motor and an engine as motive power sources. Electrically driven vehicles thus require a power storage device for supplying electric power to a motor.

One example of a power storage device for incorporation in an electrically driven vehicle is seen in Patent Document 1. This power storage device is a slim secondary cell in which a plurality of flat plate-shaped power storage cells are covered with a package member. Inside the power storage cell, a cathode (positive-pole) plate and an anode (negative-pole) plate are disposed opposite each other with a separator in between and the gap between the cathode and anode plates is filled with an electrolytic solution (though all-solid cells and all-resin cells do not contain an electrolytic solution). The package member is composed of two laminate members including a metal foil and a thermally adhesive resin layer, and those two members of the package member are heat-sealed together along their circumferential edges so as to seal in the power storage cell.

The cathode and anode plates of the power storage cell so sealed in have welded on them respectively electrode terminals such that these protrude out of the package member. Across these electrode terminals the power storage device is charged and discharged. Thus, of that part of the package member of the power storage device which is heat-sealed, the portions where the electrode terminals lie across it are heat-sealed together with the electrode terminals held between thermally adhesive resin layers. Since the electrode terminals and the thermally adhesive resin layers are formed of different materials, sufficient adhesion is required between them. Accordingly, for increased adhesion between the electrode terminals and the thermally adhesive resin layers, use is generally made of a tab film that has a heat-sealing property with both the electrode terminals and the thermally adhesive resin layers.

FIG. 17 shows an example of the manufacture of an electrode terminal component 30 with a tab film 32. First, a flat plate-shaped electrode terminal 31 formed of metal is held between two tab films 32 (FIG. 17(A)), and these are heated and pressed from above and below with a metal seal head 33 (e.g., at 190° C., 1 MPa). The tab films 32 melt and adhere to the electrode terminal 31 (FIG. 17(B)). Next, the tab films 32 are partly covered with a package member 34 (FIG. 17(C)), and these are heated and pressed from above and below with a seal bar 35 so as to be head-sealed together along the circumferential edge of the package member 34. Through the heat-sealing the power storage cell is sealed in (FIG. 17(D)), and this ensures airtightness in the electrode terminal part of the power storage cell.

CITATION LIST

Patent Literature

Patent Document 1: JP 3719235

SUMMARY OF INVENTION

Technical Problem

The cross-sectional area of an electrode terminal greatly affects charge/discharge performance, long-term reliability, lifetime length, deterioration resistance, cooling performance, electrically driven vehicles' traveling performance, and the like. Many aspects of the performance of a power storage device improve in proportion to the cross-sectional area of electrode terminals. While common electrode terminals have a thickness of 0.05 mm to 0.1 mm, seeing that as electrode terminals are thicker their cross-sectional area is larger, expectations are high for thicker electrode terminals.

Inconveniently, as an electrode terminal is made thicker, it is more likely, when a power storage cell is covered with a package member and the package member is sealed along its circumferential edge, that gaps S (ascribable to the level difference due to the electrode's thickness) are left from the tab film 32 at opposite sides of the electrode terminal 31 as shown in FIG. 17(B)-(D). This makes heat-sealing more difficult. That is, as the electrode terminal 31 is thicker, it is more difficult to fill the gaps S at its sides with the melt resin of the tab film 32, and thus the gaps S tend to be larger.

Moreover, the heating and pressing of the tab film 32 and the heating and pressing of the package member 34 produce a force that tends to peel the tab film 32 off the electrode terminal 31 (arrows m0 in FIG. 17(D)), and this makes gaps S more likely to be left. Even if no gaps S form during heat-sealing, as the tab film 32 deteriorates with time, gaps S tend to form or become larger. Thus, as the electrode terminal 31 is thicker, it is more difficult to obtain satisfactory airtightness in the electrode terminal part T, and thus, for example, the electrolytic solution inside the power storage cell is more likely to leak through the gaps S.

Made against the background described above, the present invention aims at providing a power storage device that offers satisfactory airtightness in an electrode terminal part while maintaining high performance, an electric appliance incorporating such a power storage device, and an electrode terminal for use in such a power storage device and a method of its manufacture.

Solution to Problem

To achieve the above object, according to a first aspect of the present invention, an electrode terminal component for use in a power storage device including a power storage cell and a package member covering it includes: an electrode terminal made of metal, plate-shaped, and connected to the power storage cell so as to protrude out of the package member; and a heat-seal member made of resin, having a heat-sealing property with both the package member and the electrode terminal, and formed so as to surround a predetermined area on the top, bottom, and opposite side faces of the electrode terminal. A depression or elevation is formed in a predetermined area on the opposite side faces of the electrode terminal. When the direction pointing from the electrode terminal's tip end to its connection position to the power storage cell is the electrode length direction and this electrode length direction, the electrode width direction, and the electrode thickness direction are three mutually orthogonal directions, the dimension in the electrode width direction of the depression or elevation formed on the opposite side faces of the electrode terminal is 0.1 mm or more.

According to a second aspect of the present invention, in the electrode terminal component according to the first aspect described above, a plurality of depressions or elevations are formed in the predetermined area on the opposite side faces at a pitch of 0.1 mm or more.

According to a third aspect of the present invention, in the electrode terminal component according to the first or second aspect described above, a depression or elevation is formed in a predetermined area on the top and bottom faces of the electrode terminal, and the dimension in the electrode thickness direction of the depression or elevation formed on the top and bottom faces of the electrode terminal is 0.1 mm or more.

According to a fourth aspect of the present invention, in the electrode terminal component according to the third aspect described above, a plurality of the depressions or elevations are formed in the predetermined area on the top and bottom faces of the electrode terminal at a pitch of 0.1 mm or more.

According to a fifth aspect of the present invention, in the electrode terminal component according to any of the first to fourth aspects described above, the electrode thickness is 0.15 to 10 mm.

According to a sixth aspect of the present invention, in the electrode terminal component according to any of the first to fifth aspects described above, the electrode width is 0.5 to 2000 mm.

According to a seventh aspect of the present invention, a power storage device includes: a power storage cell; a package member which covers the power storage cell; and the electrode terminal component according to any of the first to six aspects described above.

According to an eighth aspect of the present invention, an electric appliance includes the power storage device according to the seventh aspect described above.

According to a ninth aspect of the present invention, an electric appliance is configured as an electric mobile body including: a motor as a motive power source; and the power storage device according to the seventh aspect described above.

According to a tenth aspect of the present invention, an method of manufacturing the electrode terminal component according to any of the first to sixth aspects described above includes: forming the heat-seal member by insert injection molding by placing the electrode terminal in a mold and injecting resin into the mold so that the resin surrounds a predetermined area on the top, bottom, and opposite side faces of the electrode terminal.

Advantageous Effects of Invention

According to the present invention, a depression or elevation of appropriate dimensions is formed on the opposite side faces of an electrode terminal. Thus, even if the electrode terminal has a large cross-sectional area, it is possible to prevent gaps from being left from a heat-seal member at the opposite sides of the electrode terminal. Even if such gaps form, it is possible to prevent the electrolytic solution inside a power storage cell from leaking through the gaps. It is thus possible to obtain satisfactory airtightness in the electrode terminal part while maintaining high performance.

DESCRIPTION OF EMBODIMENTS

Hereinafter, power storage devices, electrode terminal components, electric appliances, and the like embodying the present invention will be described with reference to the accompanying drawings. Similar or equivalent parts among different embodiments and specific examples will be identified by the same reference signs and no overlapping description will be repeated.

Figure 1A:
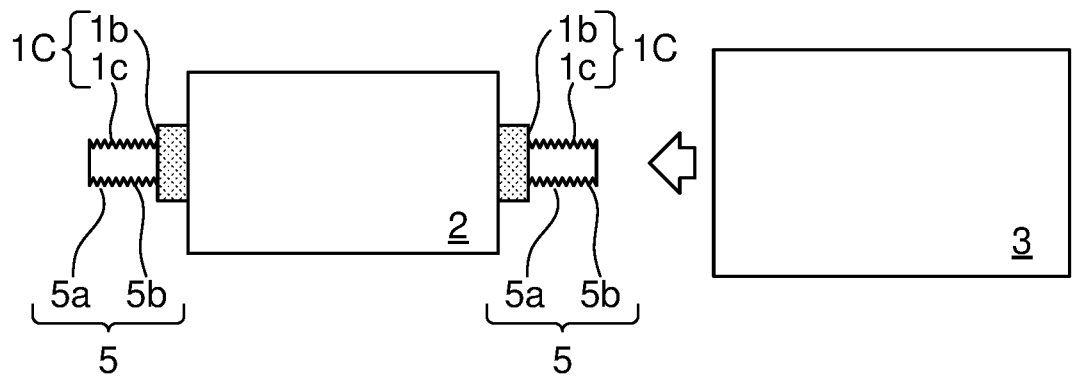
FIG. 1 comprises plan views showing an electrode terminal component and a power storage device according to one embodiment.
Figure 1B:
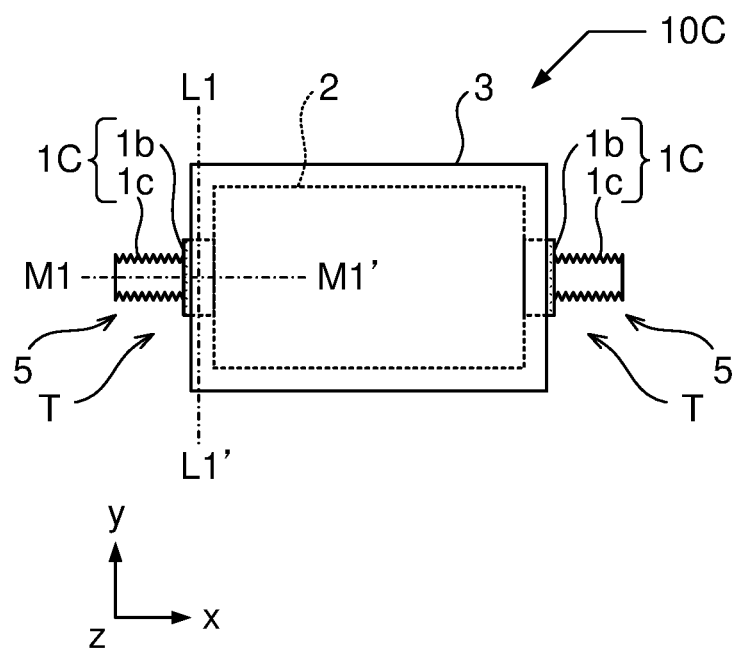
Figure 4A:
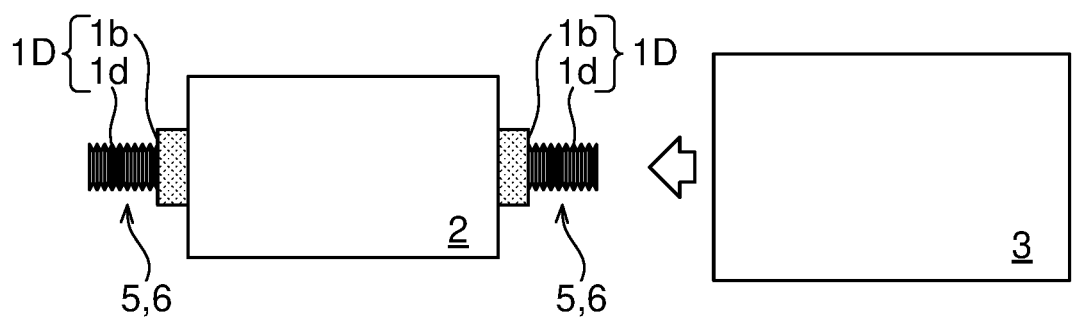
FIG. 4 comprises plan views showing an electrode terminal component and a power storage device according to another embodiment.
Figure 4B:
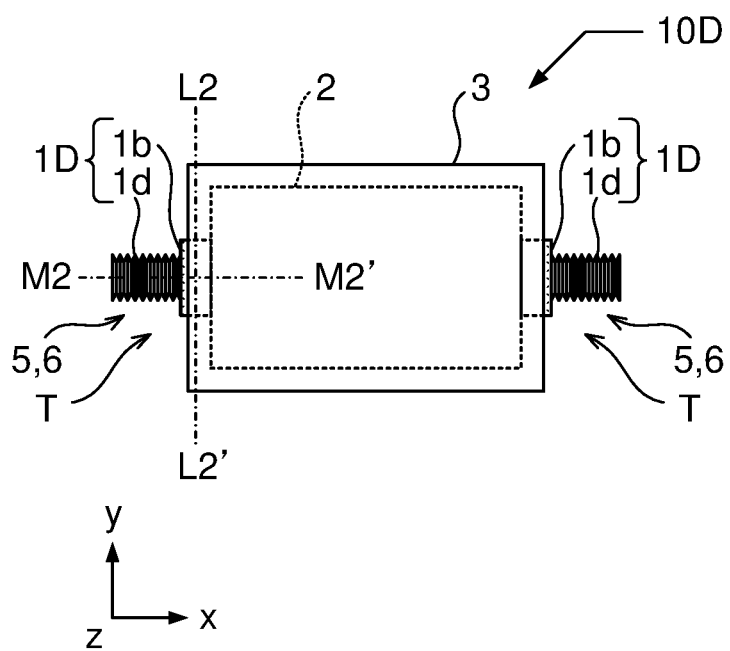

FIG. 1 comprises plan views showing an electrode terminal component 1C and a power storage device 10C according to one embodiment, and FIG. 4 comprises plan views showing an electrode terminal component 1D and a power storage device 10D according to another embodiment. The power storage device 10C includes the electrode terminal component 1C, a power storage cell 2, a package member 3, etc.; the power storage device 10D includes the electrode terminal component 1D, a power storage cell 2, a package member 3, etc. FIG. 1(A) shows the power storage cell 2 fitted with the electrode terminal component 1C, before being covered with the package member 3, and FIG. 1(B) shows the power storage cell 2 covered with the package member 3, constituting the power storage device 10C. FIG. 4(A) shows the power storage cell 2 fitted with the electrode terminal component 1D, before being covered with the package member 3, and FIG. 4(B) shows the power storage cell 2 covered with the package member 3, constituting the power storage device 10D.

Figure 2:
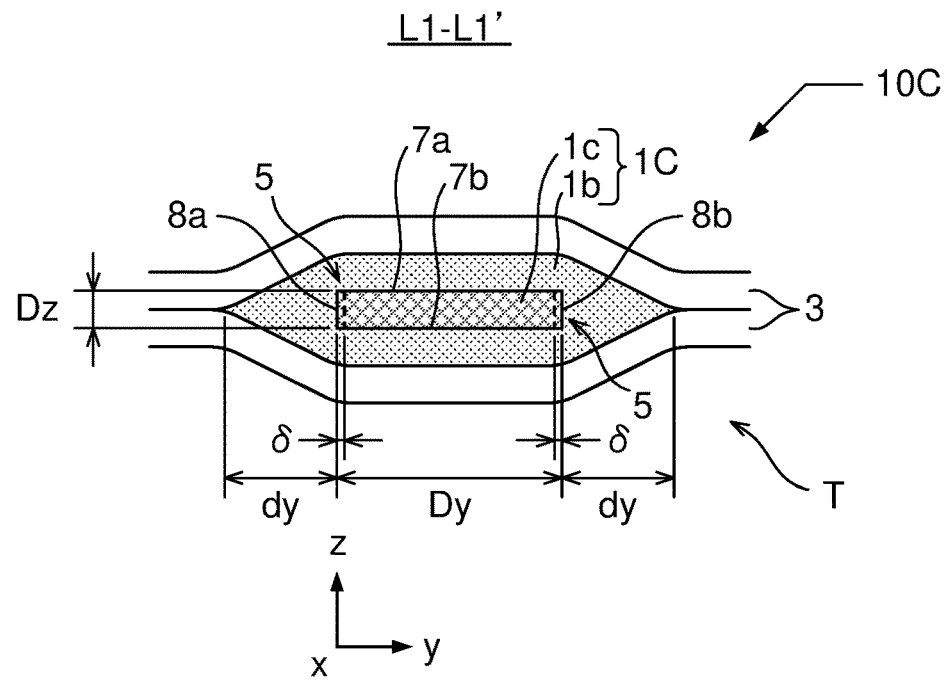
FIG. 2 is a sectional view along line L1-L1' in FIG. 1(B).
Figure 3:
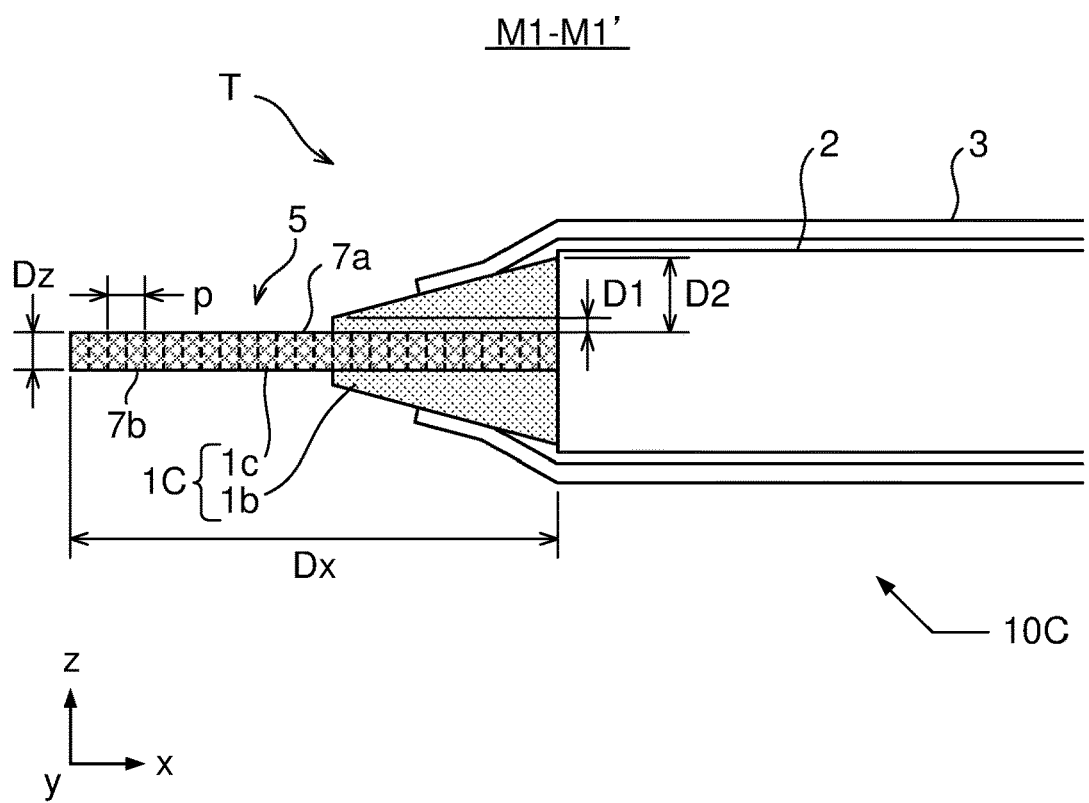
FIG. 3 is a sectional view along line M1-M1' in FIG. 1(B).
Figure 5:
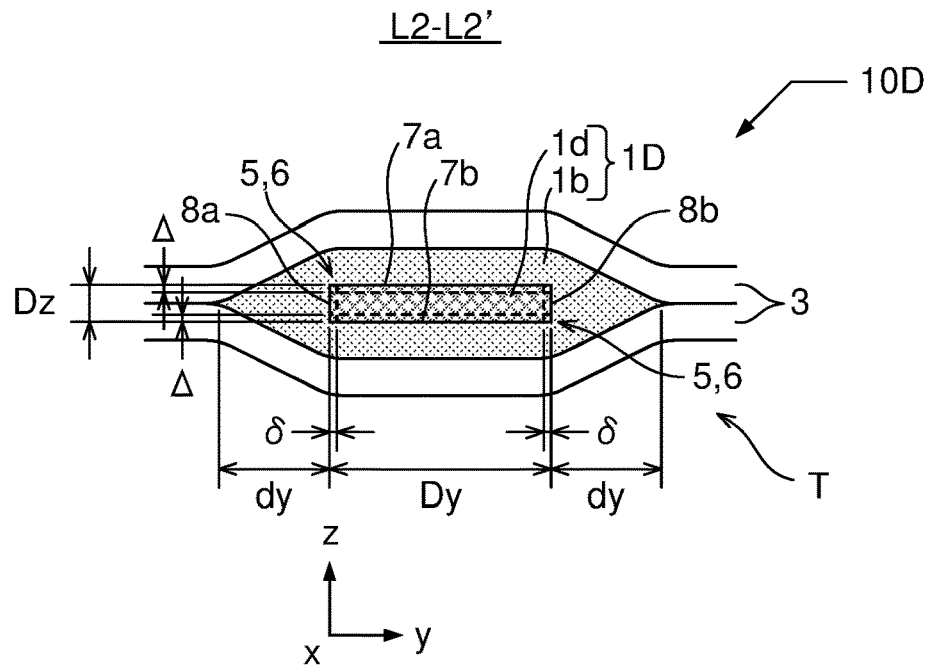
FIG. 5 is a sectional view along line L2-L2' in FIG. 4(B).
Figure 6:
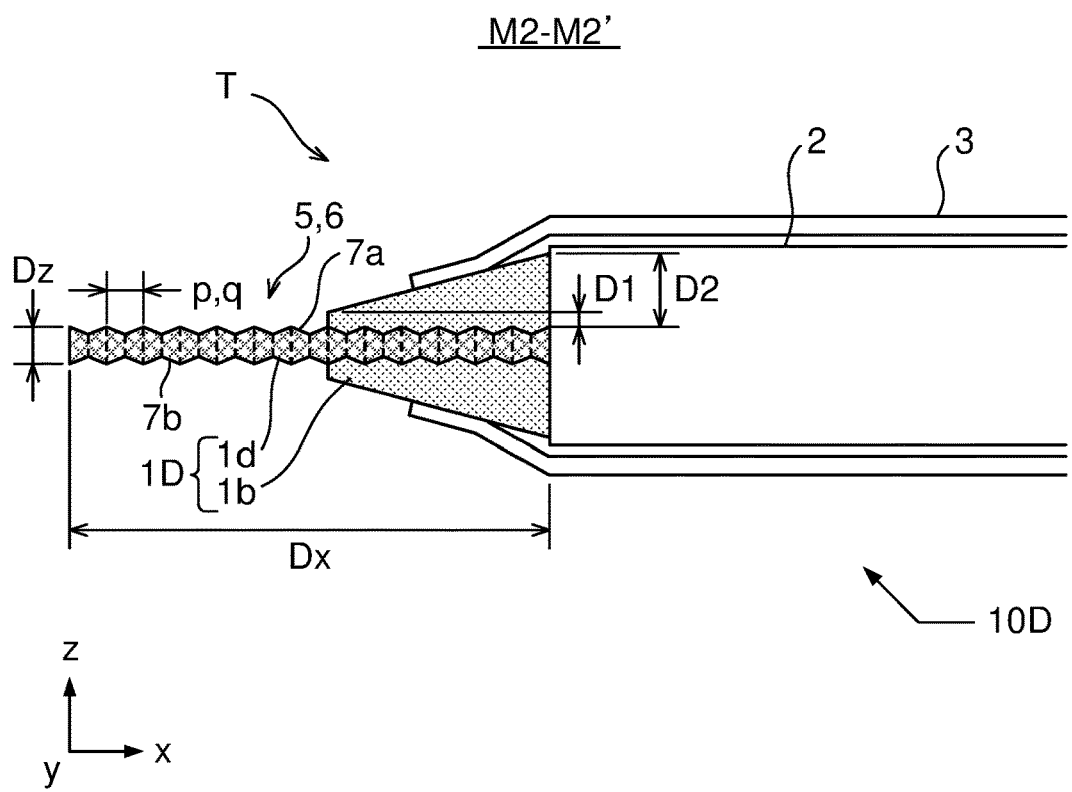
FIG. 6 is a sectional view along line M2-M2' in FIG. 4(B).

FIGS. 2 and 3 show the electrode terminal component 1C and the package member 3 heat-sealed together in an electrode terminal part T. FIG. 2 is a sectional view along line L1-L1' in FIG. 1(B), and FIG. 3 is a sectional view along line M1-M1' in FIG. 1(B). FIGS. 5 and 6 show the electrode terminal component 1D and the package member 3 heat-sealed together in an electrode terminal part T. FIG. 5 is a sectional view along line L2-L2' in FIG. 4(B), and FIG. 6 is a sectional view along line M2-M2' in FIG. 4(B).

The power storage device 10C, 10D is a slim secondary cell with a structure where a flat plate-shaped power storage cell 2 (here described as a single cell but it may comprise a plurality of cells) covered with a package member 3. Though not illustrated, the structure inside the power storage cell 2 is as follows. Inside the power storage cell 2, a cathode plate and an anode plate are disposed opposite each other with a separator in between and the gap between the cathode and anode plates is filled with an electrolytic solution (no limitation to which is meant; any electrolyte may be used, such as a solid electrolyte or a gel electrolyte). The package member 3 is, for example, composed of two laminate members including a metal foil and a thermally adhesive resin layer and those two members of the package member 3 are heat-sealed together along the circumferential edges of the package member 3 so as to seal in the power storage cell 2. The cathode and anode plates of the power storage cell 2 so sealed in have connected to them respectively electrode terminals 1c, 1d, which will be described later. Across the electrode terminals 1c, 1d, the power storage device 10C, is charged and discharged.

Specifically, the power storage device 10C, 10D can be, for example, an electric cell such as a lithium-ion cell, lithium-ion polymer cell, lithium-ion all-solid cell, lead cell, nickel-hydride storage cell, nickel-cadmium storage cell, nickel-iron storage cell, nickel-zinc storage cell, silver oxide-zinc storage cell, metal-air cell, or polyvalent cation cell; a capacitor such as an electrolytic capacitor, electric double-layer capacitor, or lithium-ion capacitor. An electric appliance that incorporates the power storage device 10D can be, for example, an electrically driven vehicle, electrically driven airplane, electrically driven ship, electrically driven satellite, power storage facility, smartphone, personal computer, camera, robot, or 3C product.

The electrode terminal component 1C (FIGS. 1-3) has an electrode terminal 1c made of metal and a heat-seal member 1b made of resin, and is disposed one at each of opposite end parts of the power storage cell 2. Similarly structured, the electrode terminal component 1D (FIGS. 4-6) has an electrode terminal 1d made of metal and a heat-seal member 1b made of resin, and is disposed one at each of opposite end parts of the power storage cell 2. The electrode terminal 1c, 1d is connected to the power storage cell 2 by, for example, welding so as to protrude out of the package member 3.

All directions mentioned in connection with the power storage device 10C, 10D shown in the diagrams are defined with reference to the electrode terminal 1c, 1d. Specifically, the direction pointing from the tip end of the electrode terminal 1c, 1d to its connection position with respect to the power storage cell 2 is the electrode length direction x, and this electrode length direction x, the electrode width direction y, and the electrode thickness direction z are three mutually orthogonal directions. The dimensions (Dx, Dy, Dz) along those directions (x, y, z) are (electrode length, electrode width, electrode thickness), and this applies to any other embodiments described later.

The electrode terminal 1c, 1d is plate-shaped, and its y-z sectional shape (FIGS. 2, 5) is rectangular. Many aspects of the performance of the power storage device 10C, (i.e., charge/discharge performance, long-term reliability, lifetime length, deterioration resistance, cooling performance, electrically driven vehicles' traveling performance) improves in proportion to the y-z sectional area of the electrode terminal 1c, 1d. For example, as the y-z sectional area of the electrode terminal 1c, 1d is larger, charging and discharging proceed faster and less heat is generated. The y-z sectional area of the electrode terminal 1c, 1d is larger as the electrode terminal 1c, 1d is thicker, and thus the electrode thickness Dz is set to be greater than that of common electrode terminals. While the y-z sectional area of the electrode terminal 1c, 1d is larger as the lateral width (electrode width Dy) of the electrode terminal 1c is larger, the electrode width Dy is set within an appropriate range with consideration given to, as the size of the power storage device 10C, 10D, the sizes of common cells (e.g., from the sizes of cells for smartphones to those of vehicle-mounted cells).

Specifically, in FIGS. 2 and 5, the electrode width Dy is 0.5 to 2000 mm (e.g., 10 to 1000 mm), and the electrode thickness Dz is larger than 0.1 mm (e.g., 0.11 to 10 mm). For example, consider a vehicle-mounted power storage device 10C, 10D (e.g., a vehicle-mounted cell with a largest face sized 100×500 mm); then, out of the considerations mentioned above, the electrode width Dy is preferably 30 to 50 mm, and more preferably 30 to 120 mm; the electrode thickness Dz is preferably 0.15 to 10 mm, more preferably 0.2 to 5 mm, and further preferably, 0.4 to 3 mm.

The heat-seal member 1b has a heat-sealing property with both the package member 3 and the electrode terminal 1c, 1d, and is formed so as to surround a predetermined area on the top and bottom faces 7a and 7b and the opposite side faces 8a and 8b of the electrode terminal 1c, 1d (see FIG. 2, 3, 5, 6). The heat-seal member 1b can be, for example, a film or sheet of resin like the tab film 32 mentioned above (FIG. 17) or a coating band of resin produced by insert injection molding.

Using a tab film 32 (FIG. 17) as the heat-seal member 1b is likely to leave gaps S as mentioned above. Even when a coating band of resin is formed by insert injection molding and is used as the heat-seal member 1b, the heading and pressing of the package member 3 during heat-sealing produces a force (arrows m0 in FIG. 17(D)) that tends to peel the heat-seal member 1b off the electrode terminal 1c, 1d, and this may leave gaps S. Even if no gaps S form during heat-sealing, as the heat-seal member 1b deteriorates with time, gaps S tend to form or become larger. Thus, as the electrode terminal 1c, 1d is thicker, it is more difficult to obtain satisfactory airtightness at the electrode terminal part T; it is thus more likely that, for example, the electrolytic solution inside the power storage cell 2 leaks through the gaps S.

The electrode terminal 1c, 1d is given a special surface shape to suppress formation and growth of gaps S and leakage of the electrolytic solution (electrolyte leakage). In the electrode terminal 1c, while the top and bottom faces 7a and 7b are flat surfaces, the opposite side faces 8a and 8b are given a depression-and-elevation structure 5 (FIGS. 1-3). In the electrode terminal 1d, the opposite side faces 8a and 8b are given a depression-and-elevation structure 5, and the top and bottom faces 7a and 7b are given a depression-and-elevation structure 6 (FIGS. 4-6).

How electrolyte leakage and the like mentioned above are suppressed will now be described with reference to the plan views in FIGS. 7 and 8. FIGS. 7(A) and 8(A) are enlarged views of relevant parts of FIGS. 1(B) and 4(B) respectively, and show how the electrode terminal components 1C, 1D and the package member 3 are heat-sealed together in an electrode terminal part T of the power storage device 10C, 10D. FIGS. 7(B) and 8(B) are enlarged views of relevant parts of an electrode terminal component 1N including an electrode terminal 1n of which the top and bottom faces 7a and 7b and the opposite side faces 8a and 8b are all flat surfaces, and show how the electrode terminal component 1N and the package member 3 are heat-sealed together in an electrode terminal part T of a power storage device 10N.

With any of the power storage devices 10C, 10D, and 10N, the heat-sealing for the sealing of the power storage cell 2 is performed in a seal region AR defined along the circumferential edge of the package member 3. In the electrode terminal part T, the seal region AR is smaller in the dimension in the electrode length direction x than the heat-seal member 1b, and thus the heat-sealing of the electrode terminal 1c, 1d with the package member 3 is performed only in their parts where the heat-seal member 1b lies between them (FIG. 2 etc.). Assuming that the dimensions of the heat-seal member 1b and the seal region AR in the electrode length direction x are, for example, 7 mm and 5 mm respectively, heat-sealing can be performed with a margin of 1 mm at each end in the electrode length direction x. This permits reliable heat-sealing with the heat-seal member 1b in between. Moreover, the heat-seal member 1b is left to protrude slightly from the package member 3, and this provides protection of the boundary part between the electrode terminal 1c, 1d and the heat-seal member 1b.

Figure 7A:
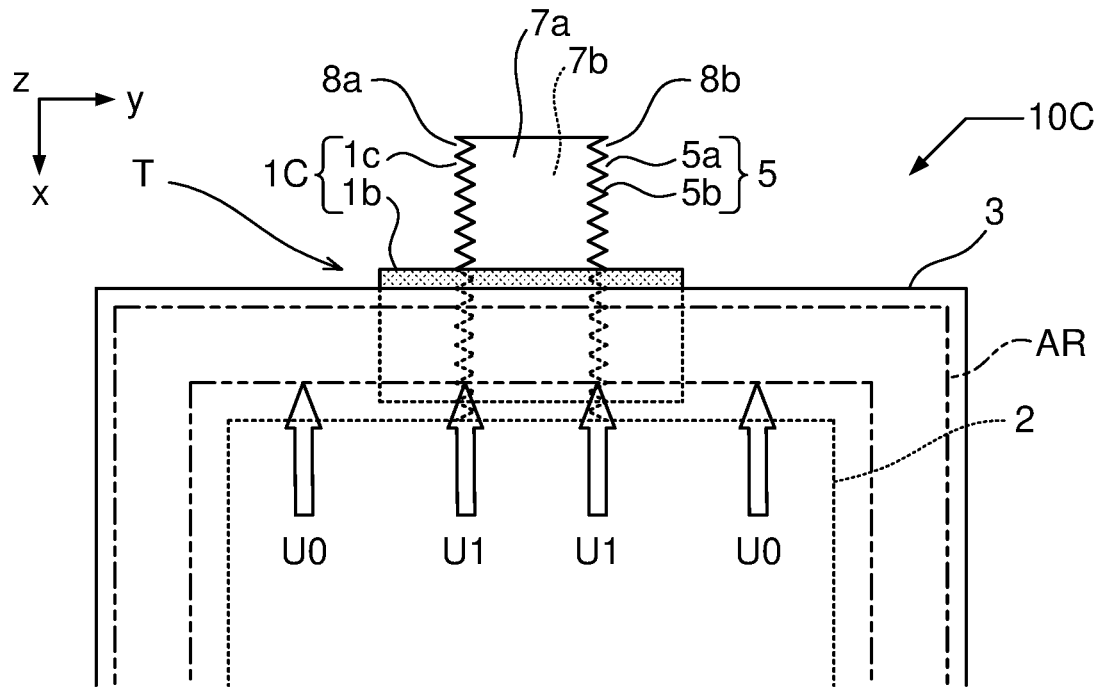
FIG. 7 comprises plan views illustrating electrolyte leakage prevention in the power storage device of FIG. 1(B).
Figure 7B:
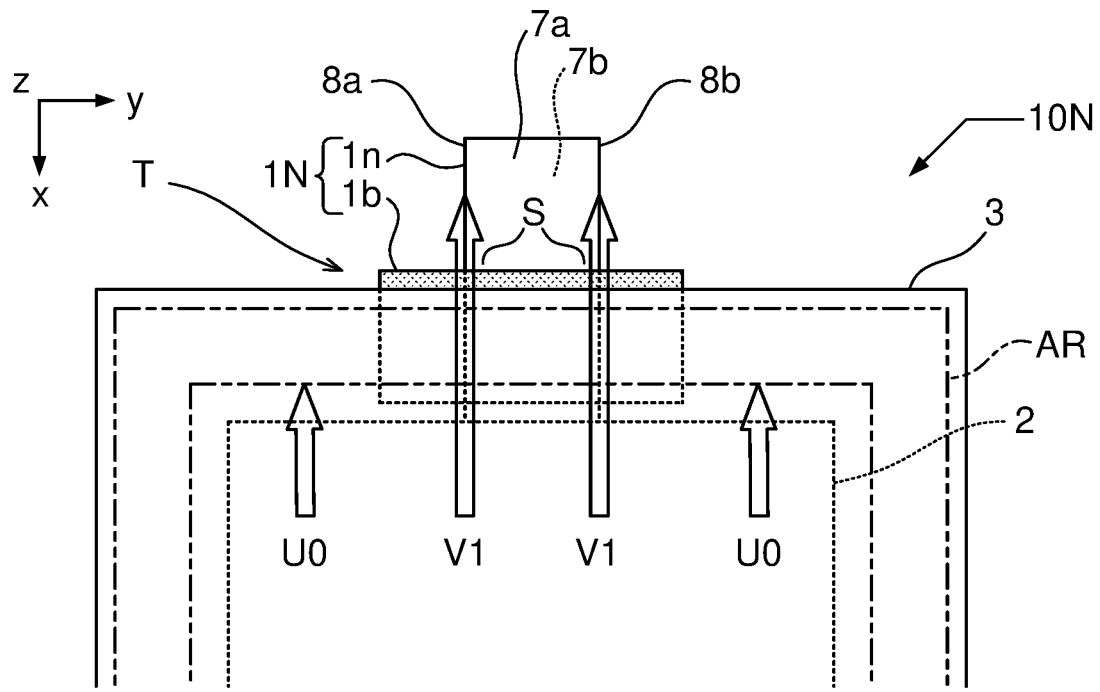
Figure 8A:
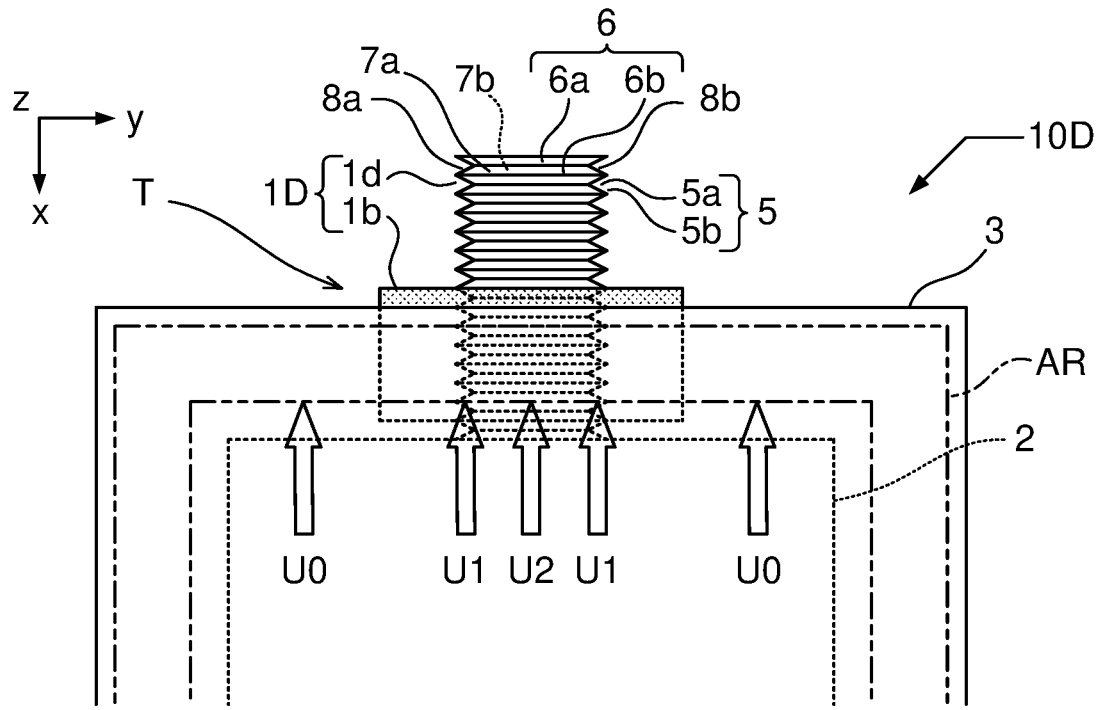
FIG. 8 comprises plan views illustrating electrolyte leakage prevention in the power storage device of FIG. 4(B).
Figure 8B:
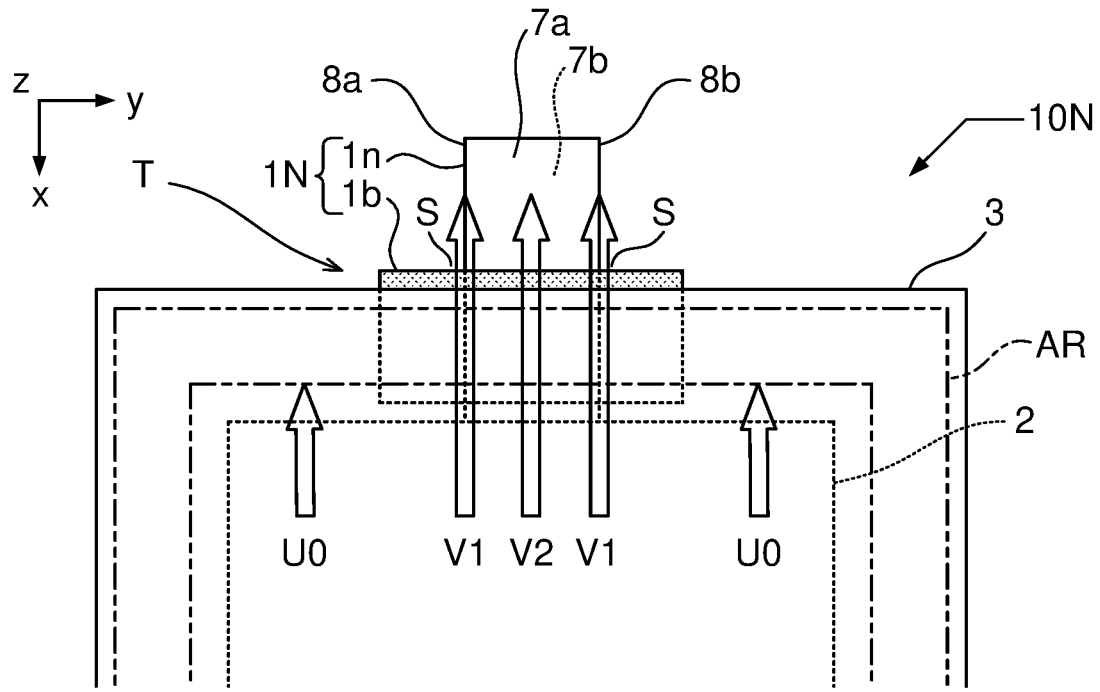

In the power storage device 10C, 10D (FIGS. 7(A), 8(A)), on the opposite side faces 8a and 8b of the plate-shaped electrode terminal 1c, 1d, a plurality of depressions 5a and elevations 5b are formed (grooving) at a pitch p (FIGS. 3, 6) of 0.1 mm or more, and these depressions 5a and elevations 5b constitute the depression-and-elevation structure 5. Moreover, in the power storage device 10D (FIG. 8(A)), on the top and bottom faces 7a and 7b of the electrode terminal 1d, a plurality of depressions 6a and elevations 6b are formed (grooving) at a pitch q (FIG. 6) of 0.1 mm or more, and these depressions 6a and elevations 6b constitute the depression-and-elevation structure 6. The depressions 5a and elevations 5b are formed in a straight shape elongate along the electrode thickness direction z, and the depressions 6a and elevations 6b are formed in a straight shape elongate along the electrode width direction y. That is, the depression-and-elevation structures 5 and 6 respectively comprise depressions 5a and 6a and elevations 5b and 6b of which each is a flat surface non-parallel to the electrode length direction x (i.e., an inclined face).

The dimension δ in the electrode width direction y of the depressions 5a and elevations 5b formed on the opposite side faces 8a and 8b of the electrode terminal 1c, 1d is 0.1 mm or more (FIGS. 2, 5), and the dimension Δ in the electrode thickness direction z of the depressions 6a and elevations 6b formed in the top and bottom faces 7a and 7b of the electrode terminal 1c, 1d is 0.1 mm or more (FIG. 5). Incidentally, the dimension δ in the electrode width direction y of the depressions 5a and the dimension Δ in the electrode thickness direction z of the depressions 6a are the depth of the depressions 5a and 6a, and the dimension δ in the electrode width direction y of the elevations 5b and the dimension Δ in the electrode thickness direction z of the elevations 6b are the heights of the elevations 5b and 6b.

Examples of the material for the electrode terminal 1c, 1d include aluminum (Al), copper (Cu), nickel (Ni), stainless steel (Sus), tin (Sn), and titanium (Ti), of which each can be used alone or as a clad material. The shaping of the electrode terminal 1c, 1d (i.e., the grooving or the like of the depressions 5a and 6a and the elevations 5b and 6b) can be done by any of known processes including machining, rolling, etching, cast molding, and sand blasting, without limitation to any of these. It is possible to adopt machining, etching, melt-cast molding, pressing, or a combined process of any of these, or anodization, acid-alkali etching, or any other type of etching. It is also possible to perform any type of plating such as electrolytic or non-electrolytic Ni plating, surface treatment such as chemical conversion treatment, or any other process before or after the shaping of the electrode terminal 1c, 1d.

In any of the power storage devices 10C, 10D, and 10N (FIGS. 7, 8), the flow U0 of the electrolytic solution can be stopped at the seal region AR elsewhere than in the electrode terminal part T. However, in the power storage device 10N (FIGS. 7(B), 8(B)), as the flow V1 of the electrolytic solution indicates, the electrolytic solution inside the power storage cell 2 may leak through gaps S. By contrast, in the power storage device 10C, 10D (FIGS. 7(A), 8(A)), the flow U1 of the electrolytic solution can be stopped at the seal region AR with the depression-and-elevation structure 5.

The depression-and-elevation structure 5 gives the opposite side faces 8a and 8b of the electrode terminal 1c, 1d a larger area of close contact with the heat-seal member 1b, and the resulting high, stable adhesion strength makes the electrode terminal 1c, 1d less likely to peel off the heat-seal member 1b (anchoring effect). As a result, gaps S are less likely to form, and this prevents electrolyte leakage across the seal region AR. Even if gaps S form, the depression-and-elevation structure 5 not only prevents the flow U1 of the electrolytic solution but also increases the length of the passage (in a zigzag shape) through which the electrolytic solution leaks through the gaps S out of the electrode terminal components 1C, 1D. This makes electrolyte leakage less likely. That is, having a surface shape non-parallel with respect to the electrode length direction x, the depressions 5a and elevations 5b act to prevent the flow U1 of the electrolytic solution.

Thus, using the electrode terminal components 1C, 1D makes it possible to easily obtain high airtightness and reliability while enhancing the performance of the power storage device 10C, 10D. Also in all-solid cells and the like that contain no electrolytic solution, gaps S may cause deterioration of the power storage device, and thus employing the depression-and-elevation structure 5 makes it possible to easily obtain high airtightness and reliability. Incidentally, during the heat-sealing for the sealing of the power storage cell 2, it is preferable that the electrode terminal 1c, 1d be heated also from the opposite side faces 8a and 8b. So heating it permits the resin forming the heat-seal member 1b to flow easily into the depression-and-elevation structure 5, and this makes gaps S less likely to form and also provides a strong anchoring effect. Thus, as the electrode terminals 1c, 1d is thicker, its heating from the opposite side faces 8a and 8b is more effective.

Even if, as in the power storage device 10C (FIG. 7(A)), the electrode terminal 1c has as its top and bottom faces 7a and 7b flat surfaces, gaps are unlikely to form that are so large as to cause electrolyte leakage. For example, with an electrode width Dy of about 40 to 50 mm, electrolyte leakage can be prevented at the seal region AR. However, with an electrode width Dy of 100 mm or more, or 500 mm or more, as shown in FIG. 8(B), the flow V2 of the electrolytic solution is difficult to stop at the seal region AR, possibly leading to electrolyte leakage. Moreover, with a large electrode length Dx, if the electrolytic solution is highly osmotic, for example, a seal region AR that is narrow in the electrode length direction x makes electrolyte leakage likely. By contrast, with the power storage device 10D (FIG. 8(A)), the flow U2 of the electrolytic solution can be stopped at the seal region AR with the depression-and-elevation structure 6.

The depression-and-elevation structure 6 functions similarly to the depression-and-elevation structure 5 described above. The depression-and-elevation structure 6 gives the top and bottom faces 7a and 7b of the electrode terminal 1d a larger area of close contact with the heat-seal member 1b, and the resulting high, stable adhesion strength makes the electrode terminal 1d less likely to peel off the heat-seal member 1b (anchoring effect). As a result, gaps S are less likely to form between the top and bottom faces 7a and 7b and the heat-seal member 1b, and this prevents electrolyte leakage across the seal region AR. Even if gaps S form, the depression-and-elevation structure 6 not only prevents the flow U2 of the electrolytic solution but also increases the length of the passage (in a zigzag shape) through which the electrolytic solution leaks through the gaps S out of the electrode terminal component 1D. This makes electrolyte leakage less likely. That is, having a surface shape non-parallel with respect to the electrode length direction x, the depressions 6a and elevations 6b act to prevent the flow U2 of the electrolytic solution.

Thus, using the electrode terminal component 1D makes it possible to easily obtain high airtightness and reliability while enhancing the performance of the power storage device 10D. Also in all-solid cells and the like that contain no electrolytic solution, gaps S between the top and bottom faces 7a and 7b and the heat-seal member 1b may cause deterioration of the power storage device, and thus employing the depression-and-elevation structure 5 makes it possible to easily obtain high airtightness and reliability. Incidentally, while in the power storage device 10D (FIGS. 6, 8(A)), the pitch p of the depression-and-elevation structure 5 and the pitch q of the depression-and-elevation structure 6 are equal, they may be given different pitches p and p (e.g., pitches corresponding to the effect with respect to the flows U1 and U2 of the electrolytic solution).

The depressions 6a and elevations 6b formed on the top and bottom faces 7a and 7b of the electrode terminal 1d are effective in preventing electrolyte leakage in cases where the electrode width Dy or the electrode length Dx is large. Specifically, even with an electrode width Dy of 100 mm or more, or even 500 mm or more, electrolyte leakage can be effectively prevented. Moreover, owing to the arrangement where, as shown in FIG. 8(A), the depressions 6a and elevations 6b are parallel to the seal region AR (elongate along the electrode width direction y) in the electrode terminal part T, the top and bottom faces 7a and 7b can be kept in closer contact with the heat-seal member 1b. This effectively prevents electrolyte leakage.

The depressions 5a and elevations 5b formed on the opposite side faces 8a and 8b are not limited to those provided on the electrode terminal 1c, 1d. Likewise, the depressions 6a and elevations 6b formed on the top and bottom faces 7a and 7b are not limited to those provided on the electrode terminal 1d. FIG. 9 is a plan view showing electrode terminals 1c, 1e having a depression-and-elevation structure 5 formed on their opposite side faces 8a and 8b. FIG. 10 is a plan view showing electrode terminals 1d, 1f having a depression-and-elevation structure 6 formed on their top and bottom faces 7a and 7b.

Figure 9A:
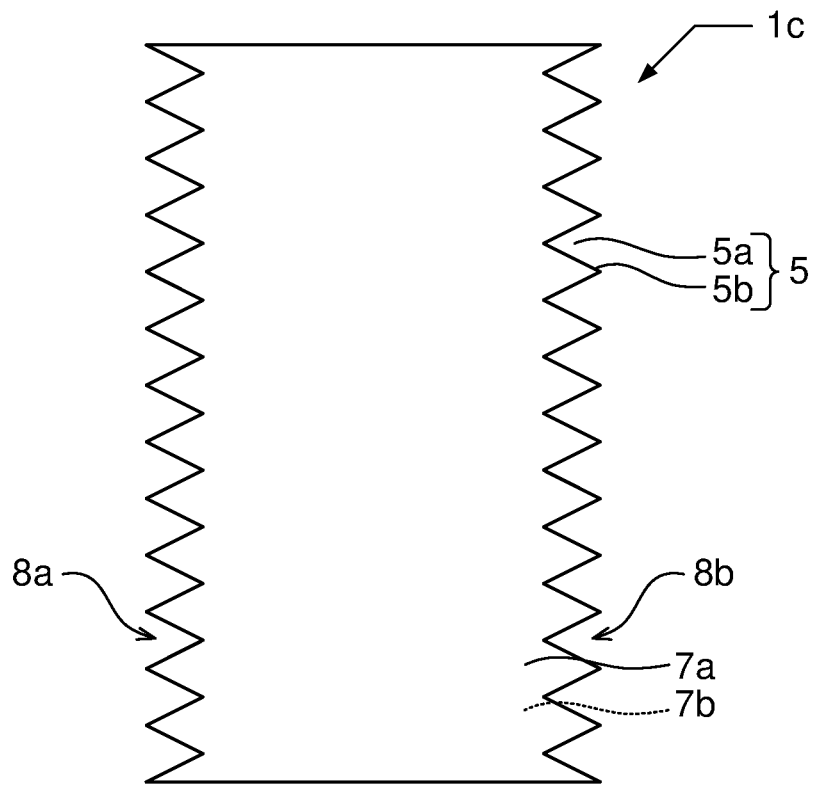
FIG. 9 comprises plan views showing a specific example of an electrode terminal having a depression-and-elevation structure formed on the opposite side faces.
Figure 9B:
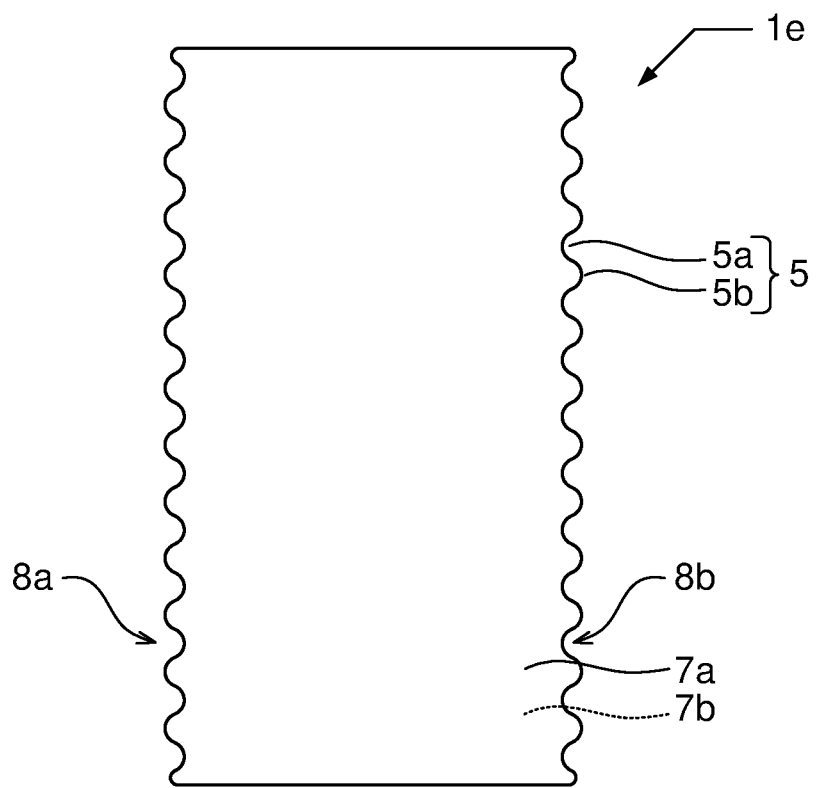
Figure 10A:
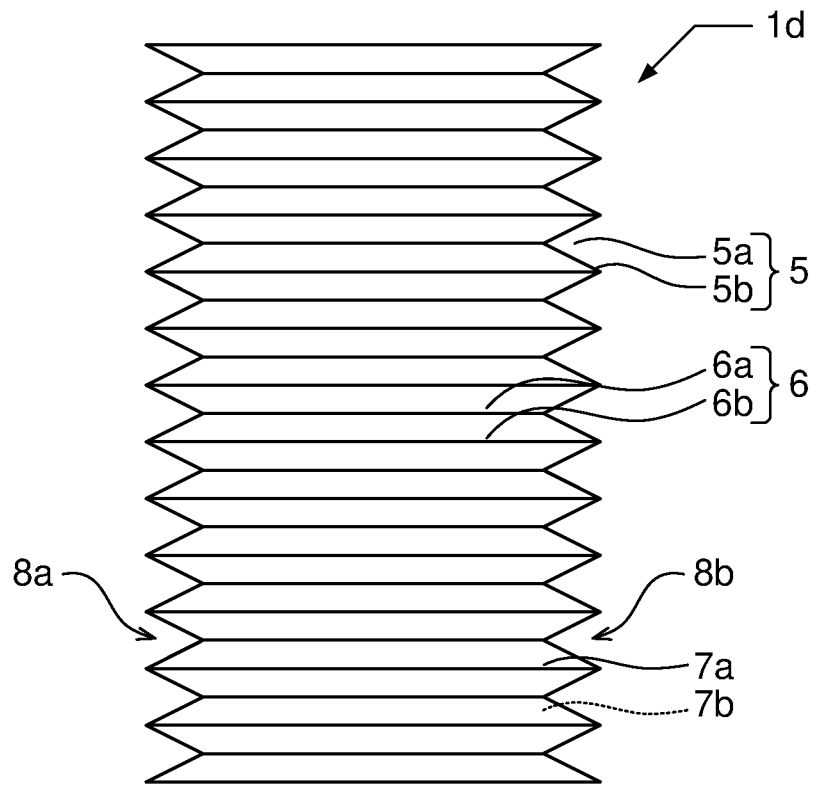
FIG. 10 comprises plan views showing a specific example of an electrode terminal having a depression-and-elevation structure formed on the top, bottom, and opposite side faces.
Figure 10B:
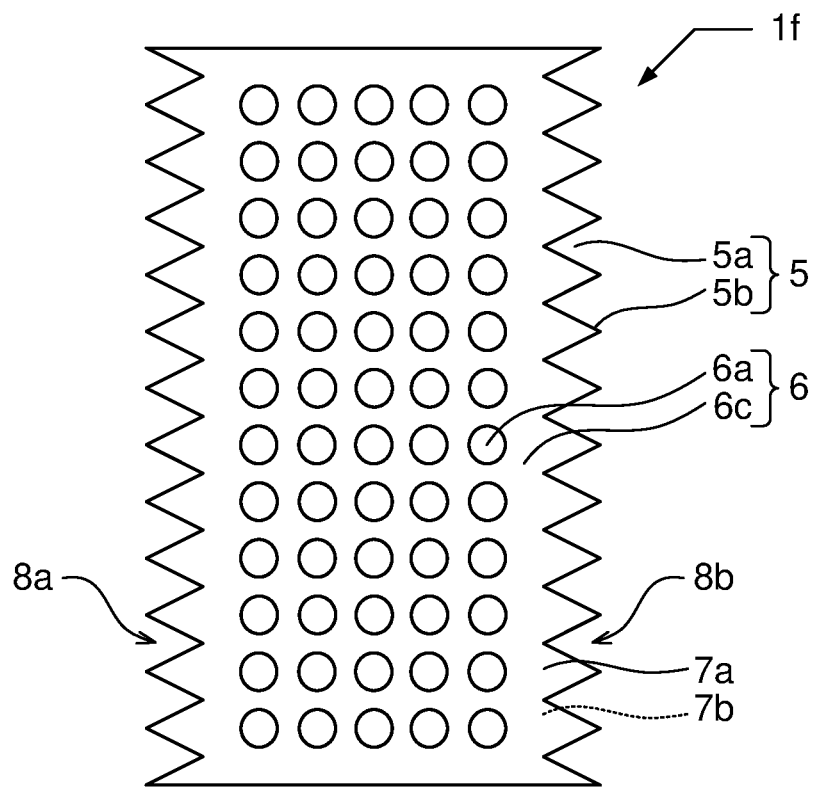

In the electrode terminal 1c shown in FIG. 9(A) and the electrode terminal 1e shown in FIG. 9(B), the top and bottom faces 7a and 7b are flat surfaces, and the opposite side faces 8a and 8b have depressions 5a and elevations 5b formed on them. In the electrode terminal 1d shown in FIG. 10(A), the opposite side faces 8a and 8b have depressions 5a and elevations 5b formed on them, and the top and bottom faces 7a and 7b have depressions 6a and elevations 6b formed on them. In the electrode terminal 1f shown in FIG. 10(B), the opposite side faces 8a and 8b have depressions 5a and elevations 5b formed on them, and the top and bottom faces 7a and 7b have depressions 6a and a flat plane 6c formed on them.

As will be understood from a comparison of FIGS. 9(A) and 9(B), while in the electrode terminal 1c the depressions 5a and elevations 5b are formed as flat surfaces (corresponding to lateral faces of a triangular prism), in the electrode terminal 1e the depressions 5a and elevations 5b are formed as curved surfaces describing a wave shape (rounded grooving). As will be understood from a comparison of FIGS. 10(A) and 10(B), while in the electrode terminal 1d the depressions 6a are formed as flat surfaces, in the electrode terminal 1f the depressions 6a are formed as dimples. In this way, as in the electrode terminals 1e, 1f, the depressions 5a and 6a, the elevations 5b and 6b, and the flat plane 6c may be given any desired shape (e.g., a shape corresponding to their effect on the flow U1, U2 of the electrolytic solution) or a shape that is a combination of a plurality of different shapes (e.g., a combination of dimples and grooves).

Since the heat-seal member 1b is formed of resin, moisture in the air may permeate through the heat-seal member 1b into the power storage cell 2. In view of this, to increase the barrier property of the heat-seal member 1b to moisture, as shown in FIGS. 3 and 6, the heat-seal member thickness D1 in the electrode thickness direction z at the tip-end side of the electrode terminal 1c, 1d is made smaller than the heat-seal member thickness D2 in the electrode thickness direction z at the connection-position side with respect to the power storage cell 2.

For example, consider a vehicle-mounted power storage device 10C, 10D (e.g., a vehicle-mounted cell with a largest face sized 100×500 mm); then, out of the above considerations, the heat-seal member thickness D1 in the electrode thickness direction z in an end part of the heat-seal member 1b at the tip-end side of the electrode terminal 1c, 1d is preferably 0.095 to 4.75 mm, and the heat-seal member thickness D2 in the electrode thickness direction z in an end part of the heat-seal member 1b at the connection-position side with respect to the power storage cell 2 is preferably 0.1 mm to 5.0 mm. Moreover, the difference between the heat-seal member cross-sectional area in the electrode thickness direction z in an end part of the heat-seal member 1b at the tip-end side of the electrode terminal 1c, 1d and the heat-seal member cross-sectional area in the electrode thickness direction z in an end part of the heat-seal member 1*b* at the connection-position side with respect to the power storage cell 2 is preferably 95% or less, more preferably 90% or less, and further preferably 85% or less.

Making the heat-seal member thickness D1 at the tip-end side smaller than the heat-seal member thickness D2 at the connection-position side as described above reduces the exposed area of the heat-seal member 1*b*, and this increases the barrier property of the heat-seal member 1*b* to moisture in the air. It is thus possible to effectively prevent moisture in the air from permeating through the heat-seal member 1*b* into the power storage cell 2. It is also possible to prevent the electrolytic solution inside the power storage cell 2 from evaporating and permeating out through the heat-seal member 1*b*.

The bonding faces of the heat-seal member 1*b* with the package member 3 are formed so as to be inclined in the x-z section (FIGS. 3, 6) and also, outward of the opposite side faces 8*a* and 8*b* of the electrode terminal 1*c*, 1*d*, in the y-z section (FIGS. 2, 5). This keeps the package member 3 and the heat-seal member 1*b* in closer contact with each other, effectively enhancing the airtightness in the electrode terminal part T. With respect to the y-z section (FIGS. 2, 5), the side-face thickness dy of the heat-seal member 1*b* (i.e., the dimension of the part of the heat-seal member 1*b* that is increasingly thin away from the side faces of the electrode terminal 1*c*, 1*d* in the electrode width direction y) is preferably 1 mm or more, and more preferably 2 mm or more. Setting the side-face thickness dy of the heat-seal member 1*b* in this way gives it a gentler inclination as the side-face thickness dy is larger. Then, even with an electrode thickness Dz of 0.4 mm or more, heat-sealing can be performed easily and satisfactorily around the circumferential edge of the package member 3, and the power storage cell 2 can be sealed in with high airtightness in the electrode terminal part T.

Figure 11A:
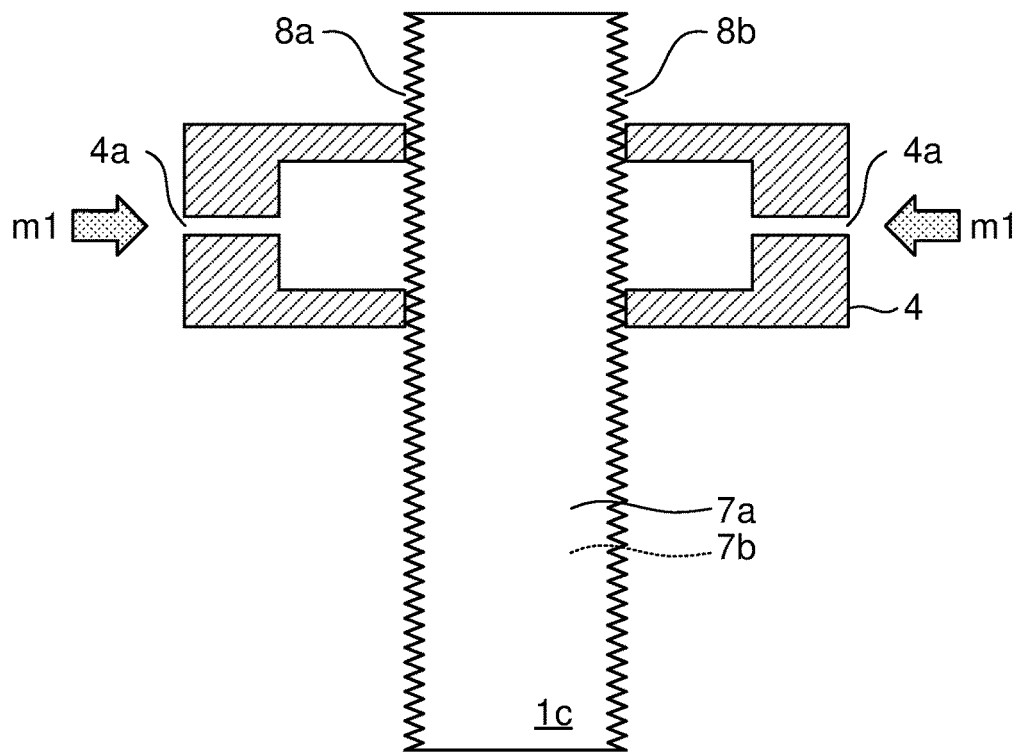
FIG. 11 comprises sectional views schematically showing insert injection molding for an electrode terminal component.

Next, a manufacturing method of the electrode terminal component 1C will be described. FIG. 11(A) schematically shows insert injection molding for the electrode terminal component 1C (FIGS. 1 to 3 etc.) described above (the electrode terminal component 1D is manufactured in a similar manner). First, an electrode terminal 1*c* made of metal is set in a mold 4 for insert injection. The mold 4 has gates 4*a* (e.g., with a gate thickness of about 100 μm) formed in it so as to face the opposite side faces 8*a* and 8*b* of the electrode terminal 1*c*. Resin is injected (arrows ml) through the gates 4*a* into the mold 4 so that the resin surrounds a predetermined area on the top and bottom faces 7*a* and 7*b* and the opposite side faces 8*a* and 8*b* of the electrode terminal 1*c*. After the injection-molded resin has set, taking the electrode terminal 1*c* out of the mold 4 gives the electrode terminal component 1C (FIGS. 1 to 3) having a heat-seal member 1*b* formed on it by insert injection molding. Any type of insert injection molding may be used, irrespective of a vertical or horizontal type.

Figure 17A:
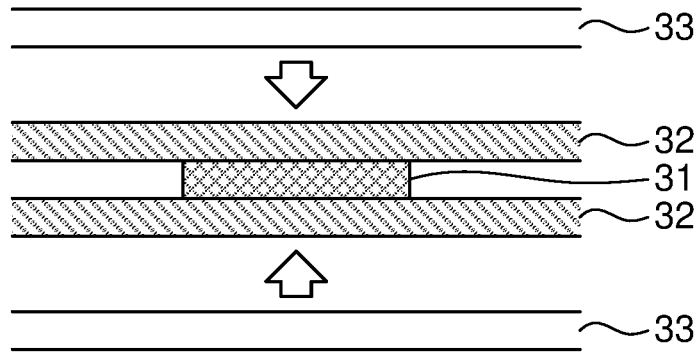
FIG. 17 comprises sectional views showing an example of the manufacture of a conventional electrode terminal component with a tab film.
Figure 17B:
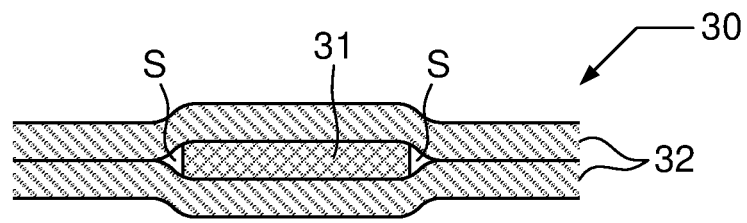
Figure 17C:
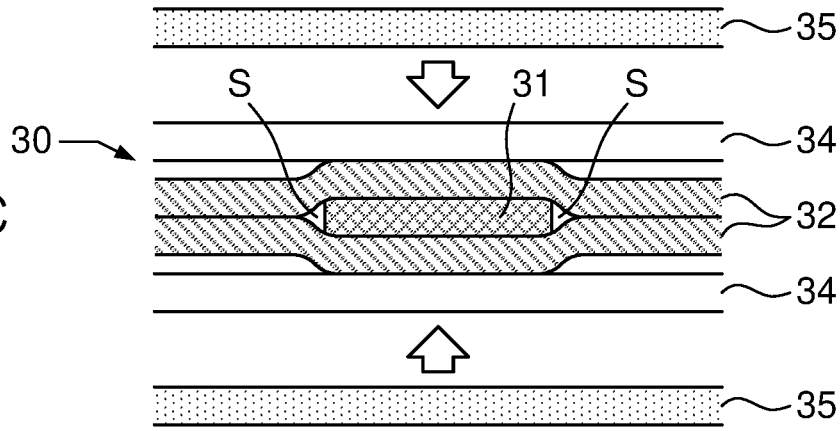
Figure 17D:
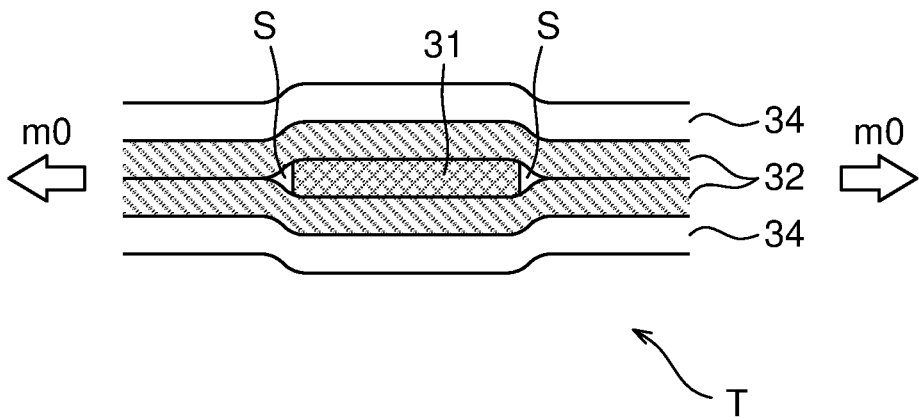

With the manufacturing method (FIG. 17) mentioned earlier that employs the tab film 32, as the electrode terminal 31 is thicker, it is more likely that gaps S are left from the tab film 32 at its opposite sides (FIGS. 17(B)-(D)). As the gaps S are larger, it is more difficult to obtain satisfactory airtightness in the electrode terminal part T and thus it is more likely that, for example, the electrolytic solution inside the power storage cell 2 leaks through the gaps S. By contrast, employing insert injection molding as shown in FIG. 11(A) permits the resin forming the heat-seal member 1*b* to reach the side faces of the electrode terminal 1*c* (FIG. 2); this prevents formation of gaps S ascribable to the level difference due to the electrode thickness Dz and improves airtightness in the electrode terminal part T. It is thus possible to obtain satisfactory airtightness even with, for example, an electrode thickness Dz of 0.4 mm or more, and to cope with electrode terminals 1*c*, 1*d*, 1*e*, 1*f* (FIGS. 9, 10) and electrode terminals with any other complicated shapes.

Insert injection molding is effective in forming a thick heat-seal member 1*b*; it can flexibly cope with various electrode terminals 1*c* irrespective of their material, surface treatment, thickness, length, and shape complexity, and can also ensure satisfactory airtightness of the products that incorporate them. The resin can be selected out of any kinds of hot-melt resin, including thermoplastic and thermosetting resins, and different kinds of resin can be freely selected and combined. For example, the heat-seal member 1*b* can be formed of, for example, a blended resin containing polyphenylene sulfide (PPS) or polybutylene terephthalate (PBT) (such as a blended resin containing at least one selected from the group of acid-modified polypropylene (PPA), acid-modified polyethylene (PEA), PP, and PE with PPS or PBT). Or the heat-seal member 1*b* may be formed of a resin containing glass fiber. Using such a blended resin or glass fiber gives the heat-seal member 1*b* enhanced heat resistance, insulation properties, mechanical strength, and the like.

The material for the tab film 32 (FIG. 17) mentioned earlier is often limited to a heat-resistant material such as polypropylene (PP, melting point: 160° C.) or polyethylene (PE, melting point: 150° C.), and this makes the sealing conditions more difficult as the tab is thicker. By contrast, using the mold 4 for insert injection allows easy molding conditions. This makes it possible to use highly heat-resistant materials such PPS (melting point: 260° C. or higher) and PBT (melting point: 220° or higher), widening the choice of selectable materials. It is then also possible to add glass fiber. Thus, through the enhancement of heat-resistance, shrinkage resistance, insulation properties, mechanical strength, and the like, it is possible to optimize the heat-seal member 1*b*.

Figure 11B:
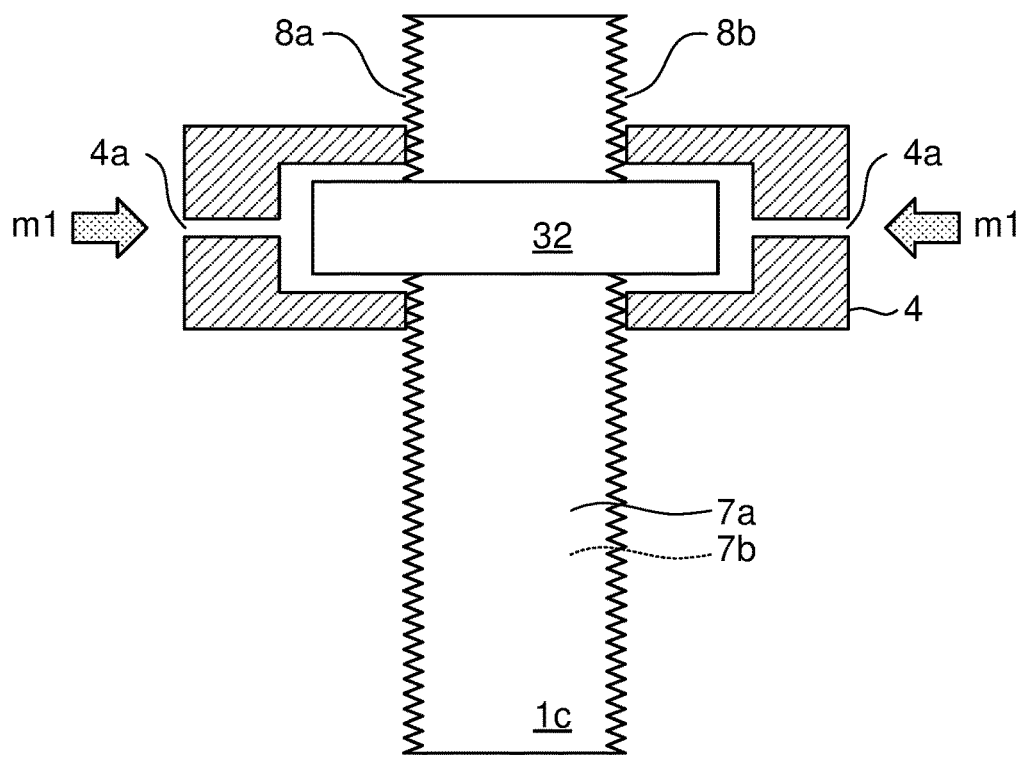

Insert injection molding may be performed on the electrode terminal 31 (FIG. 17(B)) having the tab film 32 to produce a heat-seal member 1*b* that has the tab film 32 inside it. For example, the tab film 32 is placed in the mold 4 as shown in FIG. 11(B), and then resin (e.g., a heat-resistant resin) is injected (arrow ml) through the gates 4*a* into the mold 4 so that the resin surrounds, along with the tab film 32, a predetermined area on the top and bottom faces 7*a* and 7*b* and the opposite side faces 8*a* and 8*b* of the electrode terminal 1*c*. When this is done, the tab film 32 may be placed in the mold 4 beforehand, or the electrode terminal 1*c* having the tab film 32 previously fused to it may be placed in the mold 4. After the injection-molded resin has set, taking the result out of the mold 4 gives the electrode terminal component 1C having formed on it a heat-seal member 1*b* with a two-layer structure. Giving the heat-seal member 1*b* multiple layers with a film and a molding resin of different materials in this way makes the heat-seal member 1*b* multi-functional (high heat resistance, high sealing properties, and the like)

Figure 12A:
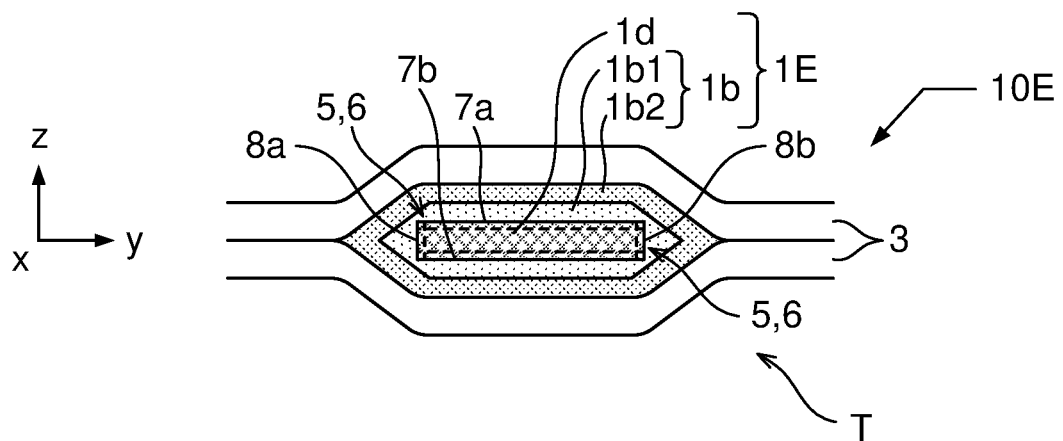
FIG. 12 comprises part sectional views showing an electrode terminal component according to yet another embodiment.
Figure 12B:
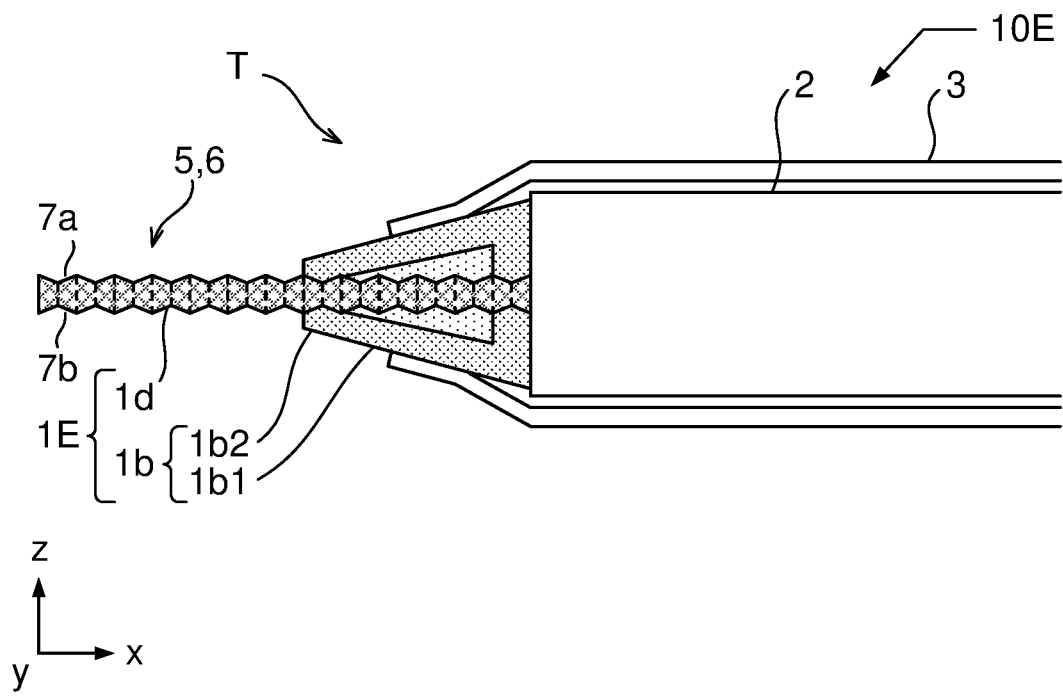

Also by performing insert injection molding a plurality of times using different resins, it is possible to give the heat-seal member 1*b* multiple layers to make it multi-functional as described above. FIG. 12 comprises sectional views of relevant parts showing an electrode terminal component 1E and a power storage device 10E having formed in them a heat-seal member 1*b* with a two-layer structure. FIG. 12(A) is a y-z sectional view, and FIG. 12(B) is an x-z sectional view. The heat-seal member 1b in this electrode terminal component 1E has two layers, namely a first heat-seal member 1b1 and a second heat-seal member 1b2.

The heat-seal member 1b with a two-layer structure can be, for example, one having polyphenylene sulfide (PPS) or polybutylene terephthalate (PBT) stacked in it.

A combination with such a resin, as compared with a combination of resins with similar properties (a combination of acid-modified PE and PE or a combination of acid-modified PP and PP), is more effective in improving heat resistance and the like. For example, by giving the heat-seal member 1b multiple layers by injection-molding the first heat-seal member 1b1 with acid-modified PP (melting point: 140° C.) and injection-molding the second heat-seal member 1b2 with PBT (melting point: 220° C. or higher), it is possible to produce a heat-seal member 1b with high heat resistance and the like.

Figure 13A:
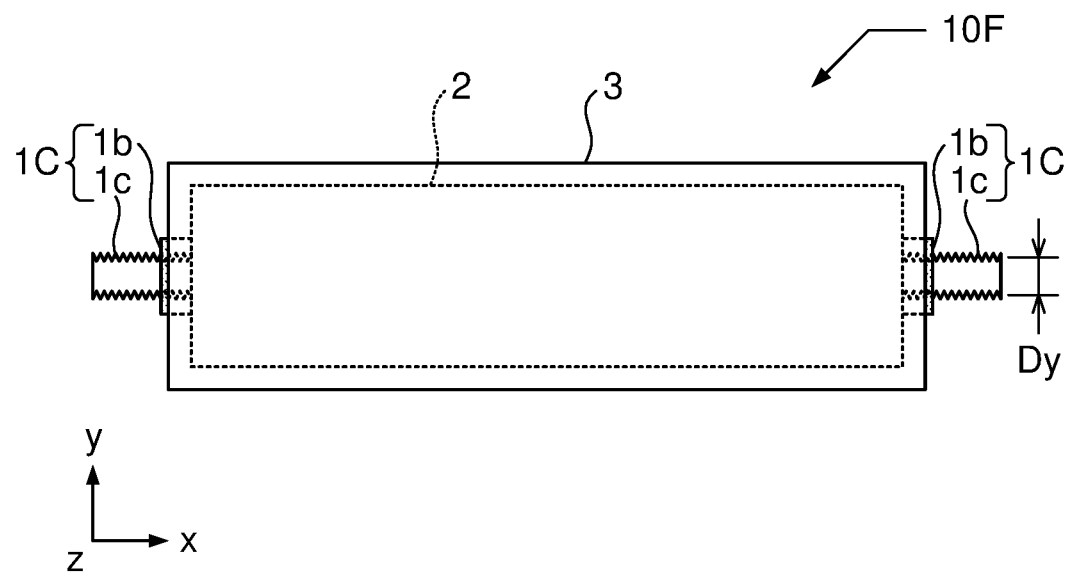
FIG. 13 comprises plan views showing two types of storage devices with different electrode terminal components.
Figure 13B:
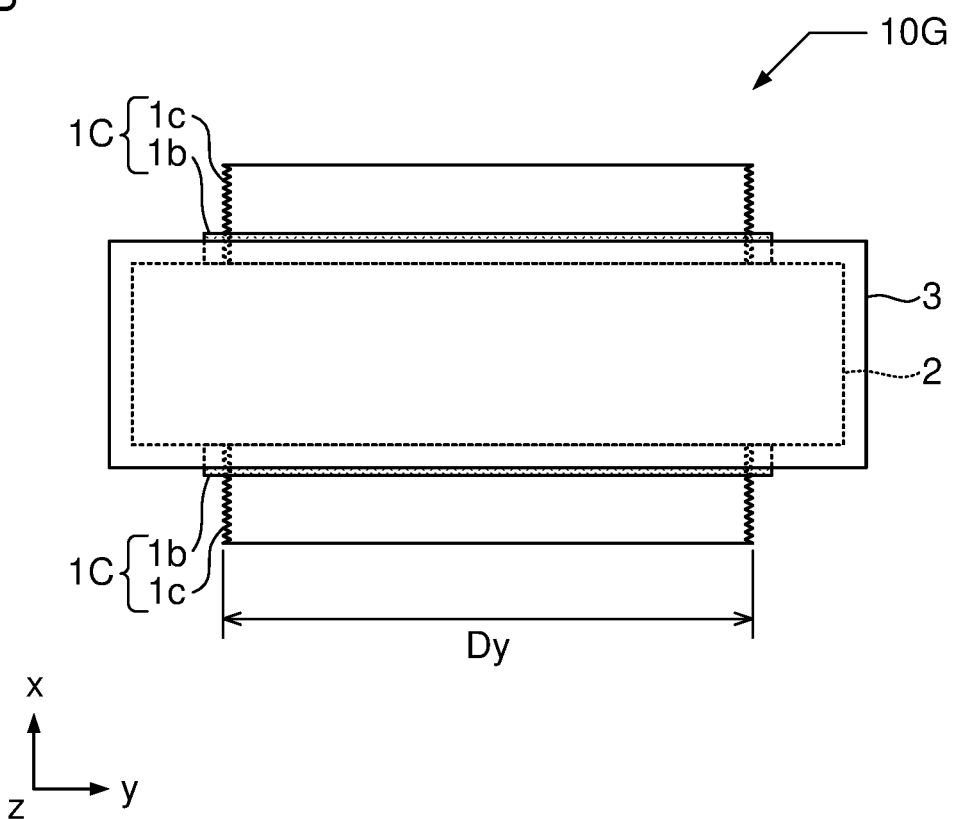

FIG. 13 comprises plan views showing two types of power storage devices 10F, 10G with different electrode terminal components 1C. FIG. 13(A) shows a power storage device 10F having an electrode terminal component 1C with a small electrode width Dy, and FIG. 13(B) shows a power storage device 10G having an electrode terminal component 1C with a large electrode width Dy. In the showing power storage devices 10F, 10G, the power storage cell 2 has a rectangular flat face (largest face) parallel to the x-y plane. In the power storage device 10F, the electrode terminal 1c with a small electrode width Dy (e.g., Dy: 30 to 1000 mm, preferably 30 to 300 mm) is connected to the side faces of the power storage cell 2 along the shorter sides of the rectangular flat face. In the power storage device 10G, the electrode terminal 1c with a large electrode width Dy (e.g., Dy: 50 to 1000 mm, preferably 100 to 700 mm) is connected to the side faces of the power storage cell 2 along the longer sides of the rectangular flat face. The heat-seal member 1b is given dimensions that suit those of the electrode terminal 1c.

Using a power storage device 10F, 10G of a type that suits the electric appliance that incorporates it permits optimization of the performance of the electric appliance. For example, the power storage device 10G includes an electrode terminal 1c with a larger y-z sectional area than that in the power storage device 10F, and thus using the power storage device 10G permits fast charging/discharging, improved charging/discharging efficiency, reduced heat generation and deterioration, easy recycling (secondary use, tertiary use, and the like), and the like. With a large electrode width Dy as in the power storage device 10G, the method (FIG. 17) of manufacturing the electrode terminal component 30 using the tab film 32 mentioned earlier requires a long seal head 33 and this makes sealing difficult; such a situation can be easily coped with by insert injection molding.

Figure 14A:
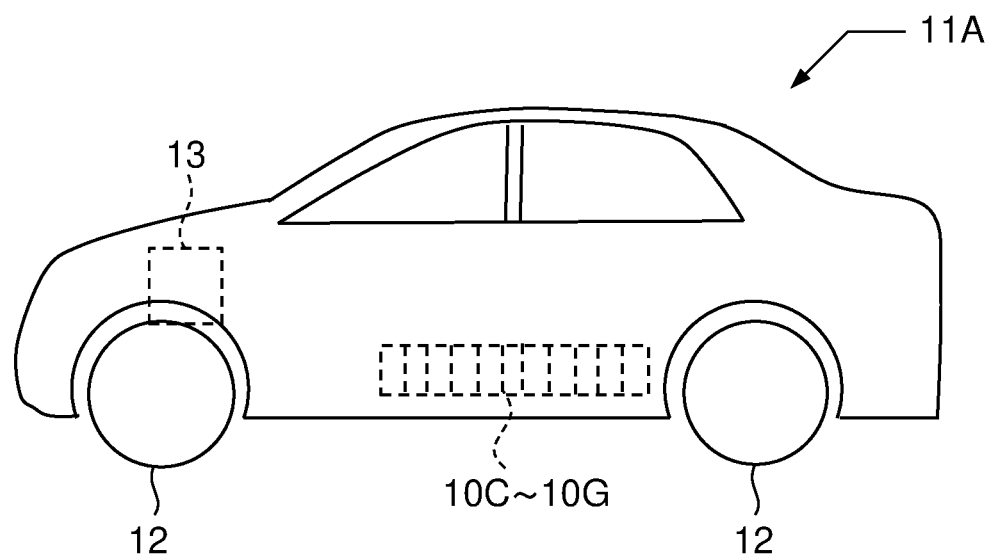
FIG. 14 comprises diagrams schematically showing an electrically driven vehicle according to a first embodiment.
Figure 14B:
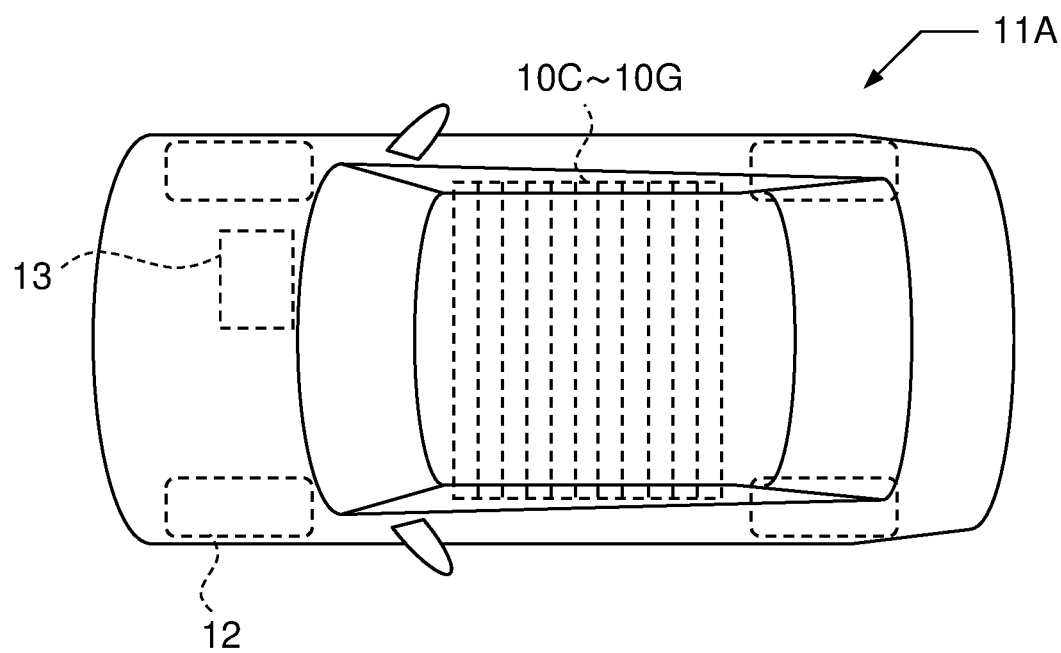
Figure 15A:
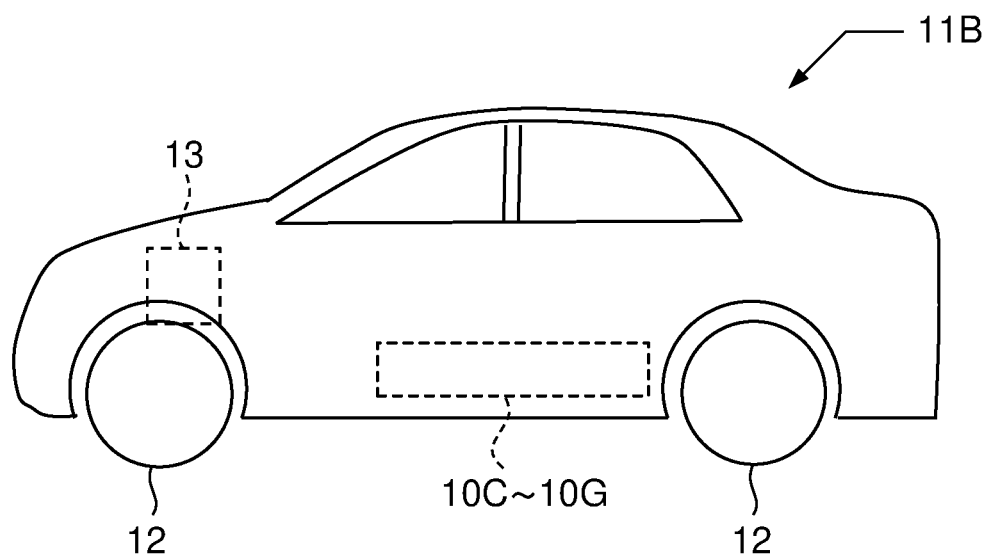
FIG. 15 comprises diagrams schematically showing an electrically driven vehicle according to a second embodiment.
Figure 15B:
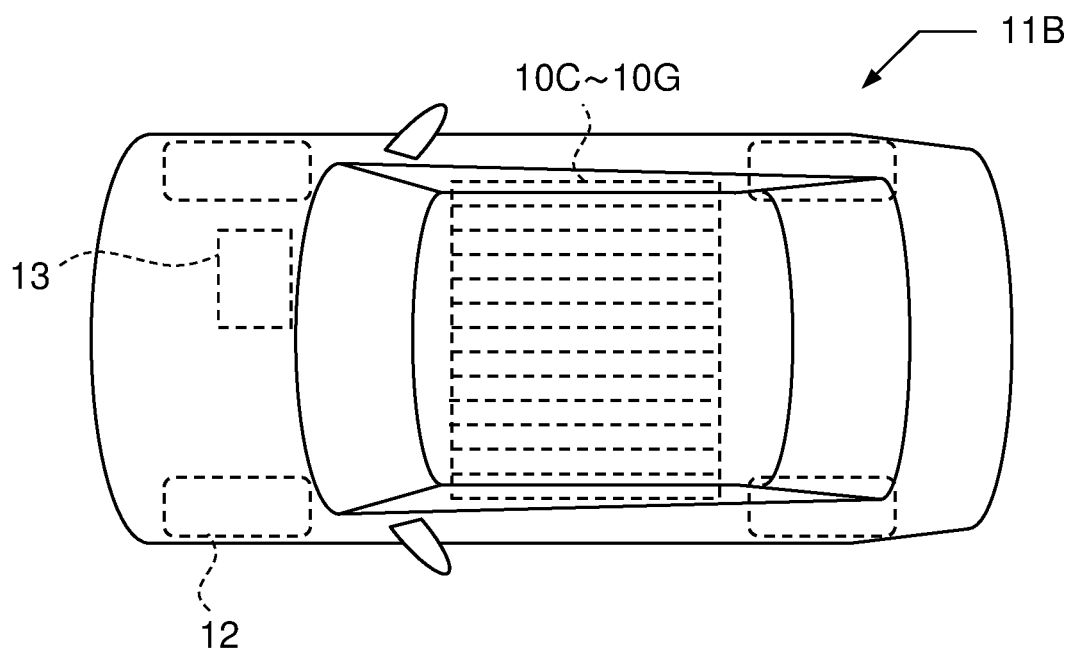
Figure 16A:
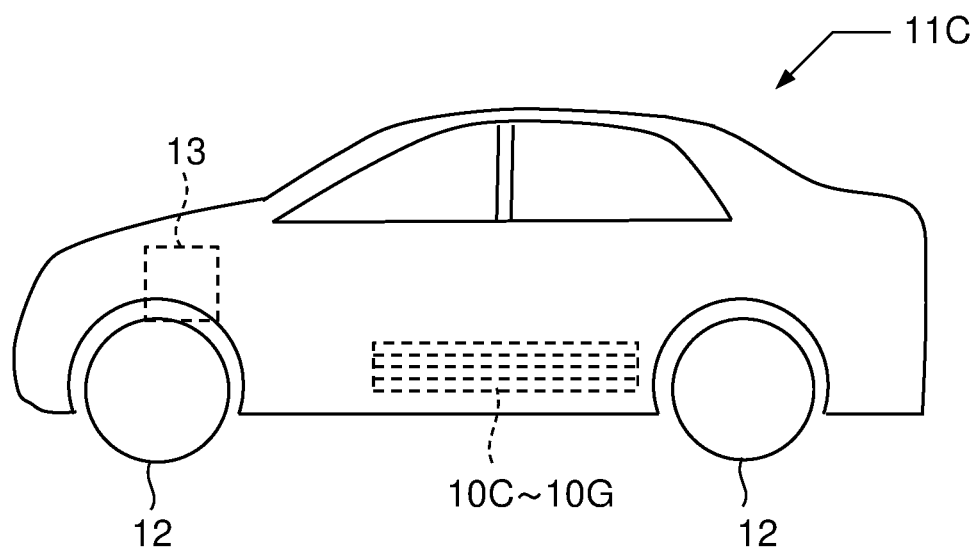
FIG. 16 comprises diagrams schematically showing an electrically driven vehicle according to a third embodiment.
Figure 16B:
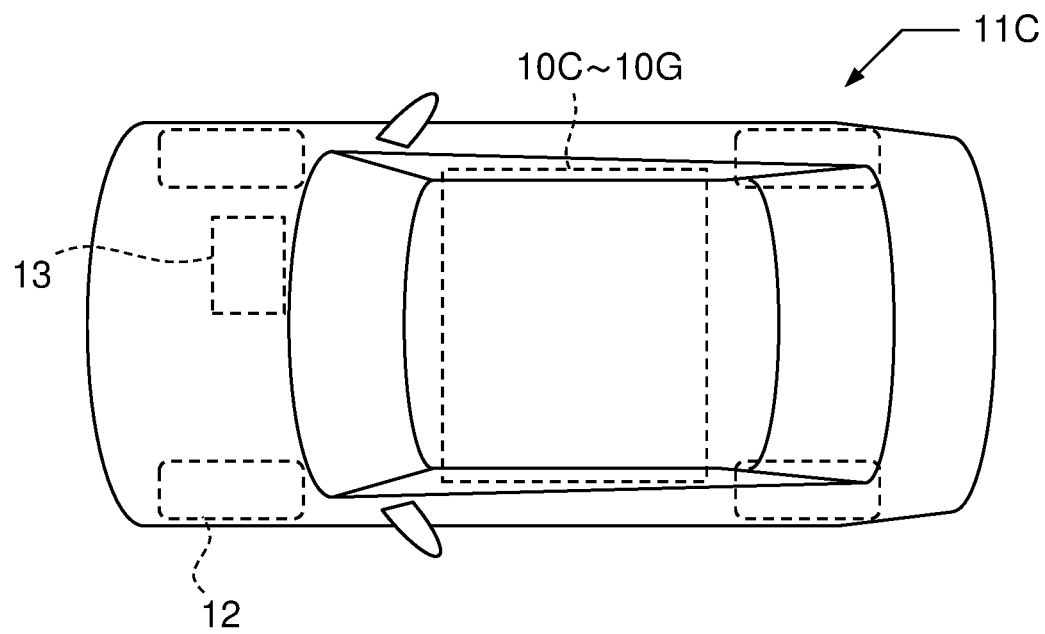

FIG. 14 schematically shows an electrically driven vehicle 11A according to a first embodiment, FIG. 15 schematically shows an electrically driven vehicle 11B according to a second embodiment, and FIG. 16 schematically shows an electrically driven vehicle 11C according to a third embodiment. In FIGS. 14 to 16, at (A) is a front view showing the door-side exterior appearance of the electrically driven vehicle 11A to 11C, and at (B) is a top view showing the roof-side exterior appearance of the electrically driven vehicle 11A to 11C. The electrically driven vehicle 11A, 11B, 11C includes wheels 12, a motor 13 as a motive power source for driving the wheels 12, power storage devices 10C to 10G for supplying the motor 13 with electric power, etc. Here, the power storage devices 10C to 10G are assumed to be vehicle-mounted cells with a largest face (the rectangular flat face parallel to the x-y plane in FIGS. 1, 4, 12, 13, etc.) sized 100×500 mm. The power storage devices 10C to 10G are arranged under the floor of the body of the electrically driven vehicle 11A, 11B, 11C, but may be arranged in the roof or in a seat.

In the electrically driven vehicle 11A, 11B, a plurality of power storage devices 10C to 10G are arranged such that their largest faces are perpendicular to the vehicle floor (vertical arrangement). That is, in the electrically driven vehicle 11A, 11B, desired electric power can be supplied from the power storage devices 10C to 10G that are arranged in the electrically driven vehicle 11A, 11B without being stacked up. This prevents damage to the package member 3 under the weight resulting from the stacking-up, leading to improved reliability of the power storage devices 10C to 10G and of the electrically driven vehicle 11A, 11B.

In the electrically driven vehicle 11C, a plurality of power storage devices 10C to 10G are arranged such that their largest faces are parallel to the vehicle floor (horizontal arrangement). This keeps the power storage devices 10C to 10G stable against the movement and vibration of the electrically driven vehicle 11C, and prevents breakage of the package member 3, leading to improved reliability of the power storage devices 10C to 10G and of the electrically driven vehicle 11A, 11B.

As described above, in the electrode terminal components 1C to 1E, the electrode terminal 1c, 1d, 1e, 1f has a depression 5a or elevation 5b of appropriate dimensions formed on its opposite side faces. Thus, even if the electrode terminal 1c, 1d, 1e, 1f has a large cross-sectional area, it is possible to prevent gaps S from being left from the heat-seal member 1b at the opposite side faces of the electrode terminal 1c, 1d, 1e, 1f. Even if such gaps S form, it is possible to prevent the electrolytic solution inside the power storage cell 2 from leaking through the gaps S. It is thus possible to obtain satisfactory airtightness in the electrode terminal part T while maintaining high performance. Moreover, using the power storage devices 10C to 10G permits fast charging/discharging, improved charging/discharging efficiency, reduced heat generation and deterioration, and easy recycling (secondary use, tertiary use, and the like).

There are no restrictions on the number and arrangement of depressions 5a and 6a and elevations 5b and 6b; one or a plurality of them may be provided, and they may be continuous or discontinuous. As more depressions 5a and 6a and elevations 5b and 6b are provided, they exert more effect, and forming depressions 5a and 6a and elevations and 6b continuously provides stable effect. Nor are there any restrictions on the depth of depressions 5a and 6a, the height of elevations 5b and 6b, their pitch, and the like; setting those dimensions at 0.001 mm or more provides comparable effect. However, with consideration given to the sizes of common power storage devices, the depth of depressions 5a and 6a and the height of elevations 5b and 6b are preferably 0.1 mm or more, and their pitch is preferably 0.1 mm or more.

The electrode thickness Dz of power storage devices used in smartphones and the like is generally 0.05 to 0.1 mm, and the electrode thickness Dz of power storage devices used automobiles an the like is generally 0.2 to 0.4 mm (e.g., 0.4 mm in electrode terminals (cathode) of Al and 0.2 mm in Ni-plated terminal of Cu (anode). These electrode thicknesses Dz can be coped with by designing the depressions 5a and 6a and the elevations 5b and 6b as described above, and so can even larger electrode thicknesses Dz (electrode thicknesses Dz of 0.5 to 3 mm, or even 10 mm or more). It is also possible to cope with standard electrode widths Dy of 20 to 70 to 100 mm and even larger electrode widths Dy (electrode widths Dy of 500 to 1000 mm).

REFERENCE SIGNS LIST 1C, 1D, 1E, 1N electrode terminal component
1c, 1d, 1e, 1f, 1n electrode terminal
1b heat-seal member (tab film, coating band)
1b1 first heat-seal member
1b2 second heat-seal member
2 power storage cell
3 package member
4 mold
4a gate
5, 6 depression-and-elevation structure
6a depression
6b elevation
6c flat plane
7a top face
7b bottom face
8a, 8b side face
p, q pitch
δ, Δ depression or elevation dimension (depression depth or elevation height)
6c flat plane
10C, 10D, 10E, 10F, 10G, 10N power storage device
11A, 11B, 11C electrically driven vehicle (electric appliance)
12 wheel
13 motor
AR seal region
S gap
T electrode terminal part
U0, U1, U2, V1, V2 electrolytic solution flow
x electrode length direction
y electrode width direction
z electrode thickness direction
Dx electrode length
Dy electrode width
Dz electrode thickness
D1 tip-end-side heat-seal member thickness
D2 connection-position-side heat-seal member thickness
dy heat-seal member side-surface thickness
30 electrode terminal component
31 electrode terminal
32 tab film
33 seal head
34 package member
35 seal bar

The invention claimed is:

1. An electrode terminal component for use in a power storage device including a power storage cell and a package member covering the power storage cell, the electrode terminal component comprising:
an electrode terminal made of metal, the electrode terminal being plate-shaped and connected to the power storage cell so as to protrude out of the package member; and
a heat-seal member made of resin, the heat-seal member having a heat-sealing property with both the package member and the electrode terminal surrounding a predetermined area on a top face, a bottom face, and opposite side faces of the electrode terminal, wherein
a plurality of depressions and a plurality of elevations are in each of a predetermined area on the opposite side faces of the electrode terminal and a predetermined area on the top and bottom faces of the electrode terminal,
an electrode length direction points from a tip end of the electrode terminal to a connection position of the electrode terminal to the power storage cell and the electrode length direction, an electrode width direction, and an electrode thickness direction are mutually orthogonal,
the depressions and elevations on the opposite side faces of the electrode terminal extend in the electrode thickness direction and are continuous in the electrode length direction,
a depth and a height of the depressions and elevations, respectively, on each of the opposite side faces of the electrode terminal are 0.1 mm or more,
the depressions and elevations on the top and bottom faces of the electrode terminal extend in the electrode width direction and are continuous in the electrode length direction, and
a depth and a height of the depressions and the elevations, respectively, on each of the top and bottom faces of the electrode terminal are 0.1 mm or more.

2. The electrode terminal component according to claim 1, wherein
the depressions and elevations in the predetermined area on the opposite side faces of the electrode terminal are at a pitch of 0.1 mm or more.

3. The electrode terminal component according to claim 1, wherein
the depressions and elevations in the predetermined area on the top and bottom faces of the electrode terminal are at a pitch of 0.1 mm or more.

4. The electrode terminal component according to claim 1, wherein
an electrode terminal thickness is 0.15 to 10 mm.

5. The electrode terminal component according to claim 1, wherein
an electrode terminal width is 0.5 to 2000 mm.

6. A power storage device comprising:
a power storage cell;
a package member covering the power storage cell; and
the electrode terminal component according to claim 1.

7. An electric appliance comprising the power storage device according to claim 6.

8. An electric appliance configured as an electric mobile body including:
a motor as a motive power source; and
the power storage device according to claim 6 supplying the motor with electric power.

9. The electrode terminal component according to claim 1, wherein
a thickness of the electrode terminal is equal to or greater than 0.2 mm but equal to or smaller than 3 mm.

10. An electrode terminal component for use in a power storage device including a power storage cell and a package member covering the power storage cell, the electrode terminal component comprising:
an electrode terminal made of metal, the electrode terminal being plate-shaped and connected to the power storage cell so as to protrude out of the package member; and
a heat-seal member made of resin, the heat-seal member having a heat-sealing property with both the package member and the electrode terminal surrounding a predetermined area on a top face, a bottom face, and opposite side faces of the electrode terminal, a plurality of depressions and a plurality of elevations are in each of a predetermined area on the opposite side faces of the electrode terminal and a predetermined area on the top and bottom faces of the electrode terminal, an electrode length direction points from a tip end of the electrode terminal to a connection position of the electrode terminal to the power storage cell and the electrode length direction, an electrode width direction, and an electrode thickness direction are mutually orthogonal, the depressions and elevations on the opposite side faces of the electrode terminal extend in the electrode thickness direction, are continuous in the electrode length direction, and a depth and a height of the depressions and elevations, respectively, on the opposite side faces of the electrode terminal are 0.1 mm or more, the depressions and elevations on the top and bottom faces of the electrode terminal extend in the electrode width direction, are continuous in the electrode length direction, and a depth and a height of the depressions and the elevations, respectively, on the top and bottom faces of the electrode terminal are 0.1 mm or more, the depressions and elevations formed in the predetermined area on the opposite side are formed faces at a pitch of 0.1 mm or more, and the depressions and elevations formed in the predetermined area on the top and bottom faces of the electrode terminal at a pitch of 0.1 mm or more.

* * * * *